United States Patent [19]

Markle et al.

[11] 4,098,980

[45] Jul. 4, 1978

[54] NON-AQUEOUS DISPERSION POLYMERIZATION OF CONJUGATED DIOLEFINS

[75] Inventors: Richard A. Markle; Richard G. Sinclair, both of Columbus, Ohio

[73] Assignee: The Goodyear Tire & Rubber Company, Akron, Ohio

[21] Appl. No.: 699,300

[22] Filed: Jun. 24, 1976

[51] Int. Cl.² ............................ C08F 2/08; C08F 2/12
[52] U.S. Cl. ................... 526/201; 260/876 B; 260/887; 260/894; 526/159; 526/335; 526/340.4
[58] Field of Search ............ 526/201, 159, 335, 340.4; 260/876 B

[56] References Cited

U.S. PATENT DOCUMENTS

| 3,218,302 | 11/1965 | Melamed ............................ 526/201 |
| 3,243,419 | 3/1966 | Ingram ................................. 526/201 |
| 3,382,297 | 5/1968 | Thompson ........................ 526/201 X |
| 3,400,113 | 9/1968 | Winter et al. ................. 526/340.4 X |
| 3,462,406 | 8/1969 | Natta et al. .................... 526/340.4 X |
| 3,499,059 | 3/1970 | Molan et al. ..................... 260/876 B |
| 3,577,395 | 5/1971 | Lal et al. ....................... 526/340.4 X |
| 3,644,585 | 2/1972 | Takayanagi et al. ............ 526/159 X |
| 3,707,585 | 12/1972 | Okamoto et al. ................ 526/201 X |
| 3,728,325 | 4/1973 | Carlson et al. .................. 526/335 X |
| 3,742,091 | 6/1973 | Moberly et al. ................. 526/201 X |
| 3,770,712 | 11/1973 | Schwab ................................ 526/201 |
| 3,770,712 | 11/1973 | Schwab ................................ 526/201 |
| 3,888,945 | 6/1975 | Arndt et al. .................. 260/876 B X |
| 3,906,057 | 9/1975 | Durst ............................... 260/876 B |
| 3,954,909 | 5/1976 | Havas et al. ..................... 260/876 B |

FOREIGN PATENT DOCUMENTS 941,305   11/1963   United Kingdom.

OTHER PUBLICATIONS

Odian, Principles of Polymerization (McGraw-Hill, 1970), pp. 593–596.

*Primary Examiner*—Thomas De Benedictis, Sr.
*Attorney, Agent, or Firm*—J. Y. Clowney

[57] ABSTRACT

A process for the non-aqueous dispersion polymerization of a conjugated diolefin monomer, for instance, butadiene or isoprene, in a liquid hydrocarbon dispersion medium, for instance, n-butane or n-pentane with a Ziegler Natta catalyst, for instance, triisobutylaluminum/titanium tetrachloride while said conjugated diolefin is in the presence of a block copolymer dispersion stabilizer. The block copolymer dispersion stabilizer is a copolymer which contains at least two blocks of polymer linked by chemical valences, at least one block (A block) is soluble in liquid organic dispersion medium and at least another block (B block) is insoluble in the dispersion medium and the stabilizer acts to disperse polymers of conjugated diolefins which are formed in the stabilizer's presence. The A block is exemplified by polyisoprene, poly(t-butyl styrene) and poly(vinyl toluene). The B block is exemplified by polystyrene, poly(α-methyl styrene), a copolymer of styrene and isoprene, poly(methyl methacrylate) and the like.

25 Claims, No Drawings

4,098,980

NON-AQUEOUS DISPERSION POLYMERIZATION OF CONJUGATED DIOLEFINS

BACKGROUND OF THE INVENTION

This invention relates to a process for polymerizing conjugated diolefins and more particularly to a process for the non-aqueous dispersion polymerization of a conjugated diolefin monomer in a liquid hydrocarbon dispersion medium with a Ziegler-Natta catalyst in the presence of a block copolymer dispersion stabilizer.

Many polymerization processes are used in the formation of synthetic polymers. Most step-growth polymerization reactions are carried out in homogeneous systems by simple combination of two or more monomers in the melt, in the absence of solvent, i.e., bulk polymerization. The principal advantage of a bulk polymerization process is that the product obtained is essentially free of diluent or impurities and can be used directly. A disadvantage of a bulk polymerization reaction is that it is difficult to control the reaction temperature.

A wide variety of polymerization methods are used in the preparation of chain-growth polymers. The radical chain-growth polymerization of olefin monomers, for example, can be conducted in a number of different types of reaction systems, including bulk polymerization, suspension polymerization, emulsion polymerization and solution polymerization. Each of these systems has certain advantages and disadvantages.

Bulk polymerization is the direct conversion of liquid monomer to polymer in a reaction system in which the polymer remains soluble in its own monomer. As noted above, bulk polymerization systems are free from diluents but the reaction temperature is difficult to control.

In suspension polymerization, the initiator is dissolved in the monomer, the monomer is dispersed in water, and a dispersing agent is incorporated to stabilize the suspension formed. All suspension polymerization processes use some type of surfactant to keep the monomer globules dispersed throughout the reaction in order to avoid coalescence and agglomeration of the polymer. Not only does the suspension stabilizer affect the particle size and shape, but also the clarity, transparency and film-forming properties of the resultant polymer. A variety of dispersing agents including water-insoluble, finely-divided, inorganic materials and organic materials, depending upon the monomer to be polymerized, have been used as dispersing agents. Thus, for example, talc, barium, calcium and magnesium carbonates, silicates, phosphates and sulfates, as well as poly(vinyl alcohol), tragacanth gum, salts of styrene-maleic anhydride copolymers, vinyl acetate-maleic anhydride copolymers and their salts, starch, gelatin, pectin, alginates, methyl cellulose, carboxymethylcellulose, bentonite, limestone and alumina have been used as suspending agents. A major advantage of suspension polymerization is that the polymeric products are obtained in the form of small beads which are easily filtered, washed and dried. For reasons of cost and nonreactivity, water is a much more desirable diluent and heat-transfer medium than most organic solvents. However, in certain catalytic polymerization processes, such as, for example, in the Ziegler-Natta catalyzed polymerization of a conjugated diolefin such as, for example, butadiene-1,3 and isoprene, the presence of any moisture is highly undesirable. Thus, suspension polymerization is not an effective process for the Ziegler-Natta catalyzed polymerization of conjugated diolefins such as butadiene-1,3 and isoprene.

An emulsion polymerization process is considered to be a three-phase reaction system consisting of large droplets of the monomer, the aqueous phase containing the dissolved initiator, and the colloidal particles of monomer-swollen polymer. While the emulsion polymerization process has the economic advantage of using water as the emulsion base, not all polymerization processes can tolerate the presence of water. Such is the case with the Ziegler-Natta catalyzed process for polymerizing butadiene-1,3 and isoprene.

In solution polymerization, an organic solvent is used which is capable of dissolving the monomer, the polymer and the polymerization catalyst or initiator. Inasmuch as the polymer is soluble in the organic solvent which is used, there is a tendency for the viscosity of the solution to increase as the molecular weight of the polymer increases. If this continues over a period of time, the solution becomes too viscous to handle in conventional polymerization reaction systems unless the solids content is limited to a low level. In commercial polymerization processes, it is desirable to obtain a polymerization mass which has a high concentration of solid polymer and, at the same time, comprises a material which is easy to handle and does not agglomerate on the walls of the reaction vessel.

Many of the polymerization processes described in the prior art relate to bulk, suspension, emulsion, or solution polymerization. These prior art processes do not possess the advantageous characteristics of the non-aqueous dispersion polymerization process of the present invention.

In U.S. Pat. No. 3,047,559 to R. H. Mayor et al (The Goodyear Tire & Rubber Company), a polymerization process is disclosed for polymerizing isoprene in the presence of a catalyst comprising a complex product of titanium tetrachloride and an organoaluminum compound or an etherate of such organoaluminum compound. The polymerization reaction is conducted either in a bulk process, a solution process or by contacting vapor of the monomer with the catalyst. When a solution process is employed, saturated hydrocarbon solvents, e.g., pentane, hexane, cyclohexane and benzene, are preferred. While this patent discloses a Ziegler-Natta catalyst, the process described in the patent does not employ a dispersion stabilizer and thus does not produce the desirable fluidity characteristics of a high solids content product obtained by the non-aqueous dispersion polymerization process of the present invention.

In U.S. Pat. No. 3,114,743 to S. E. Horne, Jr. (Goodrich-Gulf Chemicals, Inc.), a solution polymerization process is described for polymerizing isoprene to substantially cis-1,4-solid polyisoprene. According to the patent, monomeric isoprene is polymerized in the presence of a liquid hydrocarbon solvent containing a catalyst consisting essentially of the composition produced by adding to said solvent (a) a titanium tetrahalide and (b) a trialkyl aluminum wherein each alkyl group contains from 2 to 8 carbon atoms, in proportions of (a) and (b) such as to provide in said catalyst a molar ratio of titanium to aluminum of 0.5:1 to 1.5:1. The hydrocarbon solvent can be a saturated alkane such as hexane, heptane and cetane; a cycloalkane such as cyclohexane or methyl cyclohexane; or a benzene hydrocarbon such as benzene, toluene or xylene. While the catalyst in this patent is of the Ziegler-Natta type, the polymerization system is a solution polymerization system. It is noted that with heptane as the solvent, the solution becomes viscous in one hour or less and that the viscosity of the solution continues to increase during a two hour interval until the solution becomes quite viscous. Such an increase in viscosity is undesirable in a commercial process in that viscous materials are difficult to handle. In addition, more energy is required to separate the desired polymer product from a viscous material than from a material which is fluid. The polymer obtained in the Ziegler-Natta non-aqueous dispersion process of the present invention can be readily separated from the dispersion medium.

In U.S. Pat. No. 3,178,402 to D. R. Smith et al (Phillips Petroleum Company), a polymerization process is disclosed for polymerizing butadiene-1,3 in the presence of a catalyst comprising (a) a trialkyl aluminum and (b) a titanium tetraiodide. The polymerization is conducted either in a bulk process or a solution process. When a solution process is employed, various diluents including propane, n-butane, n-pentane, isopentane, hexane, isohexane, isooctane, n-decane, benzene, toluene, xylene, ethylbenzene, cyclohexane, and mixtures thereof can be employed. While the catalyst in this patent may be considered of the Ziegler-Natta type, the patent does not disclose a non-aqueous dispersion polymerization process and does not employ a dispersion stabilizer. The process described in the patent, therefore, does not have the fluidity advantages of a high solids product obtained by the non-aqueous dispersion polymerization process of the present invention.

In U.S. Pat. 3,910,869 to M. C. Throckmorton (The Goodyear Tire & Rubber Company) and U.S. Pat. 3,856,764 to M. C. Throckmorton et al (The Goodyear Tire & Rubber Company), solution polymerization processes are described for polymerizing conjugated diolefins, particularly 1,3-polybutadiene to form polymers containing cis-1,4 polybutadiene by polymerizing the conjugated diolefin in inert solvents with a complex catalyst system. The preferred solvents are hexane and benzene. The complex catalyst system comprises (1) organoaluminum compounds, (2) nickel compounds from the group of carboxylic acid salts of nickel, organic complex compounds of nickel, or nickel tetracarbonyls, (3) fluorine-containing compounds selected from the group of hydrogen fluoride or hydrogen fluoride complexes with a member of a class consisting of ketones, esters, ethers, alcohols or nitriles. While the process described in this patent gives a high proportion of cis-1,4 polymer in the polymerization product, the catalyst is somewhat more complex than the normal Ziegler catalyst. This catalyst combination, however, is very useful from a commercial standpoint. These patents are directed to solution polymerization processes and thus do not have the fluidity advantages possessed by the non-aqueous dispersion polymerization process of the present invention.

In U.S. Pat. 3,297,667 to von Dohlen et al (Union Carbide Corp.), there is disclosed a solution polymerization system for polymerizing conjugated diolefins with a catalyst comprising the reaction product (1) an ion of a group IIIb metal in a trivalent state, (2) a bidentate organic ligand, (3) a halide ion, and (4) an aluminum trialkyl or alkylaluminum halide. In U.S. Patent 3,657,205, to Throckmorton (The Goodyear Tire & Rubber Company), there is disclosed a process for the stereospecific polymerization or copolymerization of various conjugated diolefins using a catalyst which is (1) an organoaluminum compound from the class of triorganoaluminum and diorganoaluminum hydrides, (2) an organometal compound, the metal ion of which is selected from group IIIb, and (3) a compound providing a halide ion. This patent, like U.S. Pat. No. 3,297,667, teaches a solution polymerization with a catalyst somewhat more complex than a Ziegler-Natta catalyst. Thus, the polymerizations do not possess the fluidity advantages that are obtained by the non-aqueous dispersion polymerization process of the present invention.

In U.S. Pat. No. 3,170,907 to Ueda et al (The Bridgestone Tire & Rubber Company, Ltd.), there is disclosed a process for the manufacture of cis-1,4-polybutadiene which comprises polymerizing butadiene in a hydrocarbon diluent with a reaction system obtained by mixing three components consisting of (a) an organic carboxylic acid salt of nickel, (b) boron trifluoride etherate, and (c) trialkylaluminum. Like the Throckmorton patents previously mentioned, this catalyst system is more complex than a Ziegler-Natta catalyst but is suitable from a commercial standpoint to produce high cis-1,4-polybutadiene.

British Pat. No. 827,365 (Goodrich-Gulf Chemicals, Inc.) is similar to U.S. Pat. No. 3,114,743 discussed hereinabove, but includes not only heavy metals in the 4th to 6th positions, but also heavy metals up through the 10th position in the Periodic Table. While the catalyst disclosed in this patent is of the Ziegler-Natta type, the polymerization system is a solution polymerization system. The solution becomes viscous in a short period of time. As time continues to pass, the viscosity of the solution continues to increase. The patent does not disclose a non-aqueous dispersion polymerization process and does not employ a dispersion stabilizer. The process described in the patent, therefore, does not have the fluidity advantages of a high solids product obtained by the non-aqueous dispersion polymerization process of the present invention.

British Pat. No. 872,283 (Goodrich-Gulf Chemicals, Inc.) discloses a solution polymerization process for polymerizing isoprene in butane with a Ziegler-Natta catalyst system at a temperature below 10° C. The process disclosed in this patent does not employ a dispersion stabilizer and thus does not possess the advantages of the non-aqueous dispersion polymerization process of the present invention.

In Industrial and Engineering Chemistry 51, 19-22 (1959), Natsyn Pilot Plant, by C. T. Winchester (The Goodyear Tire & Rubber Company), a plant is described for the polymerization of isoprene in n-pentane with a Ziegler-Natta catalyst at a temperature of 50° C. The process described in this article is a solution process and does not employ a dispersion stabilizer. The process thus does not have the advantages of the non-aqueous dispersion polymerization process of the present invention.

For other examples of the solution polymerization of conjugated diolefins with other Ziegler-Natta catalyst systems, see U.S. Pat. Nos. 3,438,958 (Throckmorton), 3,446,787 (Throckmorton et al), 3,446,788 (Throckmorton et al), 3,483,177 (Throckmorton et al), 3,528,957 (Throckmorton et al), 3,541,063 (Throckmorton et al), 3,462,405 (Schoenberg), 3,652,529 (Judy et al), 3,734,900 (Throckmorton et al), and 3,813,374.

The references discussed above are relevent to the process of the present invention inasmuch as they relate to the polymerization of a conjugated diolefin monomer in the presence of an inert solvent with a catalyst system containing at least an organoaluminum compound and some sort of a transition metal compound. The catalyst of the references discussed are, for the purposes of this application, to be grouped under the broad terminology of Ziegler-Natta type catalyst. It should be appreciated, however, that the references discussed above are either bulk polymerizations or true solution polymerization processes. None of the aforementioned references disclose a process for the non-aqueous dispersion polymerization of conjugated diolefin monomers in a liquid hydrocarbon dispersion medium with a Ziegler-Natta catalyst in the presence of a block copolymer dispersion stabilizer in accordance with the process of this invention.

There are other references that disclose catalytic non-aqueous dispersion polymerization of olefins but either the process does not employ a Ziegler-Natta catalyst or the process does not relate to the polymerization of a conjugated diolefin. Such is the case with British Pat. Nos. 941,305; 1,007,476; 1,008,188; 1,123,611; and 1,165,840; Belgian Pat. No. 669,261; South African Pat. No. 72/7635; and Netherlands Pat. Nos. 65/11663 and 72/06366.

British Pat. No. 941,305 (Imperial Chemical Industries Limited) relates to stable dispersions of synthetic polymers in an organic liquid wherein the disperse particles of polymer are stabilized by a block or graft copolymer. One constituent of the stabilizing copolymer is solvated by the organic liquid; the other constituent of the copolymer forms an integral part of the polymer particles. The soluble constituent is irreversibly attached to the disperse particle through chemical bonds. Where the disperse polymer is polar, e.g., methyl acrylate, the organic liquid is non-polar, e.g., aliphatic hydrocarbon. Where the disperse polymer is non-polar, e.g., styrene, vinyl toluene or polyisoprene, the organic liquid is polar, e.g., ethyl alcohol, methyl alcohol, or acetone. The block copolymer stabilizer can be preformed or it can be formed in situ during formation of the disperse particle. The block copolymer preferably contains one constituent which is identical with, or closely related to, the polymer to be produced. For example, where the disperse polymer is styrene, the compatible constituent of the block may be styrene or a copolymer of styrene and vinyl toluene. There is no disclosure of a Ziegler-Natta catalyst in this patent. This patent does not disclose a process for the non-aqueous dispersion polymerization of a conjugated diolefin monomer with a Ziegler-Natta catalyst in accordance with the process of the present invention.

British Pat. No. 1,007,476 (The Firestone Tire & Rubber Company) relates to a process in which at least one ethylenically unsaturated monomer is contacted with an anionic polymerization catalyst, e.g., butyllithium, in an organic liquid, said liquid having dissolved therein a polymeric substance as a suspending agent and said liquid is a non-solvent for the polymer produced by the process. Isoprene is one of the substances which can be polymerized by the process. Organic solvents which are disclosed include saturated and unsaturated aliphatic and cycloaliphatic hydrocarbons containing from 3 to 30 carbon atoms, e.g., propane, butane, isobutane, pentane, isopentane, hexane, butene-1, cyclohexane, mineral oil, kerosene, etc. The dispersing agent must be at least partially soluble in the organic medium. Examples of dispersing agents include polymers and copolymers of conjugated diolefins which contain 4 to 6 carbon atoms, e.g., polybutadiene-1,3, polypiperylene, polyisoprene, and copolymers of such diolefins with a styrene monomer, e.g., styrene and alpha-methyl-styrene. Other dispersing agents include copolymers of ethylene and propylene, copolymers of isobutylene and isoprene and copolymers of isobutylene and styrene. In reviewing the prior art, this patent discloses that a Ziegler catalyst is undesirable because of catalyst contamination in the polymer product. This patent does not disclose a process for the non-aqueous dispersion polymerization of a conjugated diolefin monomer with a Ziegler-Natta catalyst in accordance with the process of the present invention.

British Pat. No. 1,008,188 (The Firestone Tire & Rubber Company) is similar to British Pat. No. 1,007,476 except that the monomer which is polymerized according to this patent is a vinyl aromatic compound, e.g., styrene. The catalyst is an anionic polymerization catalyst e.g., butyllithium. The organic liquid in which the reaction is conducted is a non-solvent for the polymer produced by the process. The organic liquid has a dispersing agent dissolved therein, said dispersing agent being a polymer or copolymer of a conjugated diolefin which contains 4 to 6 carbon atoms, e.g., polybutadiene-1,3; polypiperylene, and copolymers of such diolefins with a styrene monomer, e.g., styrene and α-methylstyrene. Other dispersing agents are copolymers of ethylene and propylene, copolymers of isobutylene and isoprene and copolymers of isobutylene and styrene. The organic liquid includes saturated and unsaturated aliphatic and cycloaliphatic hydrocarbons containing from 3 to 30 carbon atoms, e.g., propane, butane, isobutane, pentane, isopentane, hexane, butene-1, cyclohexane, mineral oil, kerosene, etc. In reviewing the prior art, this patent discloses that a Ziegler catalyst is undesirable because of catalyst contamination in the polymer product. This patent does not disclose a process for the non-aqueous dispersion polymerization of a conjugated diolefin monomer with a Ziegler-Natta catalyst in accordance with the process of the present invention.

British Pat. No. 1,123,611 (Imperial Chemical Industries Limited) relates to a process of forming stable dispersions of a polymer with a free-radical initiator in an organic liquid in which the polymer is insoluble, said process comprising the polymerization of at least one ethylenically unsaturated monomer in the organic liquid in the presence of a preformed dispersion stabilizer. The stabilizer comprises the product of a condensation reaction between (a) at least one component which has a molecular weight of from 500 to 5000 and is solvatable by the organic liquid and contains a group capable of a condensation reaction and (b) another component which has a molecular weight of at least 250 and is of different polarity from the solvatable component and relatively non-solvatable in the organic liquid and contains a group capable of a condensation reaction with the solvatable component. The weight ratio of (a) to (b) is from 0.5:1 to 5:1. The stabilizers disclosed in the patent are different from those employed in the process of the present invention. Ziegler-Natta catalysts are not disclosed in the patent. Therefore, this patent does not disclose a process for the non-aqueous dispersion polymerization of a conjugated diolefin monomer with a Ziegler-Natta catalyst in accordance with the presence of the present invention.

British Pat. No. 1,165,840 (Hercules Incorporated) relates to a process for obtaining a colloidal dispersion of a propylene homopolymer or copolymer of propylene with an alpha olefin having 2 to 20 carbon atoms or with styrene in an inert hydrocarbon diluent such as n-heptane and kerosene. The polymerization catalyst comprises a Ziegler-Natta catalyst. When preparing a colloidal dispersion of polypropylene, it is necessary first to prepare a colloidal trivalent titanium catalyst and then use this colloidal trivalent catalyst in combination with an aluminum alkyl to polymerize the propylene and obtain the colloidal dispersion. Thus, an alpha-olefin containing at least 6 carbon atoms, e.g., octene-1 is polymerized with a trivalent titanium-containing catalyst and a dialkylaluminum halide catalyst activator in the presence of a liquid hydrocarbon. The catalyst dispersion thus formed is used to polymerize propylene or a mixture of propylene and a comonomer which is an alpha-olefin containing 2 to 20 carbon atoms or styrene. A solid, colloidally dispersible propylene polymer product is recovered. This patent does not disclose a process for the non-aqueous dispersion polymerization of a conjugated diolefin monomer with a Ziegler-Natta Catalyst in accordance with the process of the present invention.

Belgian Pat. No. 669,261 (Imperial Chemical Industries Limited) is similar to British Pat. No. 1,165,840 in that it relates to a process for the dispersion polymerization of ethylene using a dispersion of a Ziegler-Natta catalyst in aliphatic hydrocarbons. The patent does not disclose the Ziegler-Natta non-aqueous dispersion polymerization of a conjugated diolefin in the presence of a block copolymer dispersant in accordance with the process of the present invention.

South African Pat. No. 72/7635 (Imperial Chemical Industries Limited) relates to an anionic initiated (metal hydrocarbyl, e.g., alkyl lithiums and alkyl sodiums) non-aqueous dispersion block polymerization of a polymeric material in a diluent wherein at least one polymer block is insoluble in said diluent and which forms at least part of the core of the final polymeric product and another block which is solvated by the diluent and which provides stabilization for the final polymerization product. Diluents include aliphatic hydrocarbons having from 3 to 10 carbon atoms, aromatic hydrocarbons, e.g., benzene and toluene, and cycloaliphatic hydrocarbon, e.g., cyclohexane. This patent includes butyllithium-initiated non-aqueous dispersion polymerization of conjugated diolefins where the dispersant can comprise three blocks; block "A" can be polymerized t-butyl styrene; block "B" can be polymerized butadiene, isoprene or n-butyl styrene; and block "C" can be polymerized styrene, vinyl pyridine, divinyl benzene, a styrene-divinyl benzene mixture, methylmethacrylate, ethyl acrylate, dimethylaminoethyl methacrylate or methacrylonitrile. This patent does not disclose the Ziegler-Natta polymerization process of the present invention.

Netherlands Patent No. 65/11663 (Imperial Chemical Industries Limited) relates to the non-aqueous dispersion polymerization of methyl methacrylate, styrene, lauryl methacrylate, glycidyl methacrylate and combinations of methacrylates. Stabilizers include long chain paraffinic acids, esters of fatty acids or diacids, fatty acid esters of acrylic or methacrylic acid, long-chain poly(vinyl esters), polyolefins, or polydiolefins. Addition polymers are formed with a Ziegler-Natta catalyst. The polymer is grafted onto a soluble polymer. The process of the patent does not employ block copolymers in accordance with the process of the invention. There is no disclosure in the patent of a process for the non-aqueous dispersion polymerization of a conjugated diolefin monomer in a liquid hydrocarbon dispersion medium with a Ziegler-Natta catalyst in accordance with the process of the present invention.

Netherlands Pat. No. 72/06366 (Mobile Oil Company) relates to the non-aqueous dispersion polymerization of styrene using a block copolymer as the dispersing agent. The dispersion medium can be an aliphatic hydrocarbon containing 4 to 7 carbon atoms including butane, pentane, isopentane, hexane and heptane. Isoprene is disclosed as a suitable monomer in forming a block copolymer dispersant for the polymerization of styrene. While a Ziegler-Natta catalyst is disclosed in connection with the formation of a conjugated diolefin as a dispersing agent, there is no disclosure wherein the main polymer is formed by the Ziegler-Natta polymerization of a conjugated diolefin monomer in the presence of said dispersing agent. This patent, therefore, does not disclose the non-aqueous dispersion polymerization process of the present invention.

The references reviewed hereinabove fail in one or more respects to teach or disclose the process of the present invention. In summation, some of the references disclose bulk or solution (but not non-aqueous dispersion) polymerization of a conjugated diolefin monomer with a Ziegler-Natta catalyst. Other references disclose non-aqueous dispersion polymerization of olefins (but not conjugated diolefins) with a Ziegler-Natta catalyst. Still other references disclose non-aqueous dispersion polymerization of conjugated diolefins with an anionic catalyst, i.e., butyllithium (but not a Ziegler-Natta catalyst). Still other references disclose non-aqueous dispersion polymerization wherein the polymer is grafted onto a soluble polymer but not wherein the dispersant is a block copolymer as employed in accordance with the process of the present invention.

As reported hereinabove, the polymer of a conjugated diolefin monomer, such as, for example, poly-cis-1,4-isoprene has been obtained previously in a solution polymerization process wherein isoprene is polymerized in a solvent such as n-pentane, n-hexane, or n-heptane in the presence of a Ziegler-Natta catalyst. As the molecular weight of the polyisoprene increases in a solution polymerization process, the viscosity of the solution in which the polymer is dissolved also increases. In a short period of time, the polymer solution becomes so viscous that it does not flow and the polymer product plates out on agitator blades and on the walls of the reaction vessel unless the solids content is limited to a low level. In such a solution polymerization process, the limit of solids that can be handled in a commercial reactor system is typically about 10 to about 12 grams of poly-cis-1,4-isoprene per 100 cc of polymer solution, i.e., a solids content of about 14 to about 18 weight percent. If high molecular weight poly-cis-1,4-isoprene could be produced in appreciably higher solids concentrations, considerable savings could be realized in the cost of its production in a given reaction system.

In the non-aqueous dispersion polymerization process of the present invention, a Ziegler-Natta catalyzed process for the polymerization of a conjugated diolefin, such as, for example, isoprene is provided utilizing a block copolymer dispersion stabilizer and a dispersion medium such as n-butane or neopentane. The concentration of the poly-cis-1,4-isoprene in the polymeric product solution is greater than that obtained in a solution-type Ziegler-Natta catalyzed process for the polymerization of isoprene utilizing no dispersion stabilizer and n-pentane as the diluent medium. Whereas a solids content of about 14 to about 18 weight percent is obtained in conventional solution polymerization of isoprene, a solids content of about 25 to about 50 weight percent is obtained in the process of the present invention while the polymerizate particles are finely divided and flowable and the mixture has a much lower viscosity.

It should be appreciated that conjugated diolefins can also be polymerized in solution utilizing lithium metal catalyst or mono-organolithium catalyst or diorganolithium catalyst. These solution polymerizations, like some of the references discussed in this application, are solution polymerizations and they themselves do not possess the fluidity advantages possessed by the non-aqueous dispersion process of the present invention. It should be understood that the polymerization of conjugated diolefins by means of a lithium based catalyst of the prior art are solution polymerization processes. None of the known references disclosed a process for the non-aqueous dispersion polymerization of conjugated diolefin monomers in a liquid hydrocarbon dispersion medium with a lithium based catalyst in the presence of a block copolymer dispersion stabilizer in accordance with the process of this invention. The non-aqueous dispersion process of a lithium based catalyzed polymerization of a conjugated diolefin such as, for example, isoprene or butadiene with, for instance, lithium metal or organolithium compounds such as dilithiostilbene or butyllithium is provided utilizing a block copolymer dispersion stabilizer and a dispersion medium such as n-butane or neopentane. The concentration of the polyconjugated diolefin in the product solution is greater than that obtained in the solution type lithium based catalyzed process for the polymerization of conjugated diolefins utilizing no dispersion stabilizer and n-pentane or n-hexane as the diluent medium. Whereas a solid content of about 14 to about 18 weight percent is obtained in the conventional or prior art solution polymerization of conjugated diolefins with these lithium based catalysts, a solid content of from about 25 up to about 50 weight percent can be obtained in the process of the present invention when the polymerizate particles are finely divided and flowable and the mixture has a much lower viscosity.

SUMMARY OF THE INVENTION

In accordance with the present invention, a process is provided for the non-aqueous dispersion polymerization of a conjugated diolefin monomer in a liquid hydrocarbon dispersion medium with a Ziegler-Natta catalyst in the presence of a block copolymer dispersion stabilizer. The dispersion stabilizer comprises a copolymer containing two or more blocks linked together by chemical valences at least one of which blocks is soluble in the dispersion medium and at least another of which blocks is insoluble in the dispersion medium and the stabilizer acts to disperse polymers of conjugated diolefins which are formed in the stabilizers presence. According to one embodiment of the invention, a dispersion stabilizer is prepared in a non-aqueous medium, such, as for example, benzene. The dispersion stabilizer is then separated from the non-aqueous medium and dried to remove all volatile diluents. The dried dispersion stabilizer is then admixed with the conjugated diolefin monomer, a liquid hydrocarbon, e.g., n-butane, neopentane or mixed isomeric pentanes, in which the monomer is soluble and its subsequent polymer is insoluble, and a Ziegler-Natta catalyst. The admixture thus formed is subjected to polymerizing conditions to produce a polymerizate comprising a non-aqueous dispersion of conjugated diolefin polymer. The main polymer dispersions of the present invention may have concentrations varying from 1 to 60 weight percent or higher solids content. Preferably, the dispersions have a solids content of between about 15 and about 50 weight percent. The main polymer dispersions may be used as obtained, or dried, or diluted to any desired concentration.

The process of the invention has a number of important advantages over the prior art processes.

(1) Polymerizates of the conjugated diolefins are much more tractable. Without the stabilizer, they do not flow when the percent solids of high molecular weight polymer is greater than about 15 to 20 percent. With stabilizer, the dispersion of polymer is flowable and can be discharged from the reactor. Solids can be increased to a manageable 40 to 50 percent.

(2) Dispersions of polyconjugated diolefins are obtained in n-butane and other aliphatic hydrocarbons that are flowable, and do not adhere to the reactor walls when hot, e.g. 40° C., while, after removing the polymerizate from the reactor and allowing it to cool to room temperature, e.g., 25° C., the product sediments from the diluent. Residual diluent in the polymer is easily flashed-off. Overall, isolation of product is greatly facilitated by this discovery.

(3) Addition of alcohol to terminate the polymerization improves the processability by lowering the viscosity.

(4) The polymers of the conjugated diolefins exhibit improved self tack when compared with polymers synthesized in a solution process, e.g., in hexane. This property results in markedly improved green strength between multiple plies of unvulcanized rubber and reinforcing fabrics during the construction of tire bodies. As a result the tire manufacturing process is simplified.

DETAILED DESCRIPTION OF THE INVENTION

Block Copolymer Dispersion Stabilizer

In the non-aqueous dispersion polymerization process of the present invention for polymerizing a conjugated diolefin monomer in a liquid hydrocarbon dispersion medium with a Ziegler-Natta catalyst in the presence of a block copolymer dispersion stabilizer, the block copolymer dispersion stabilizer is selected from a variety of polymers containing at least two blocks linked by chemical valences wherein at least one of said blocks ("A" block) is soluble in the dispersion medium and at least another of said blocks ("B" block) is insoluble in the dispersion medium, and the stabilizer acts to disperse polymers of conjugated diolefins which are formed in the stabilizer's presence. The insoluble "B" block provides an anchor segment for attachment to the conjugated diolefin polymer, thus reducing the solubility of the polymerized conjugated diolefin in the dispersion medium. The soluble "A" block of the dispersion stabilizer provides a sheath around the otherwise insoluble polymer and maintains the polymeric product as numerous small discrete particles rather than an agglomerated or highly coalesced mass. The insoluble "B" block may, if desired, contain a plurality of pendent groups.

The soluble "A" block is selected from a variety of polymers, copolymers, and their derivatives such as, for example, polyisoprene, poly(t-butylstyrene), poly(vinyl toluene), polybutadiene, polymerized higher alkyl methacrylates, polyisobutene, poly(vinyl butylether) and copolymers thereof, i.e., those polymers which are soluble in the liquid hydrocarbon dispersion medium.

The insoluble "B" block is chosen for its ability to produce dispersions with the conjugated diolefin monomer to be polymerized in the subsequent non-aqueous dispersion polymerization process. The "B" block also produces dispersions of the polymers formed from the conjugated diolefins. The insoluble "B" block is selected from a variety of polymers and copolymers such as, for example, polystyrene, poly($\alpha$-methylstyrene), copolymers of styrene with isoprene or butadiene, copolymers of $\alpha$-methylstyrene with isoprene or butadiene, polymerized lower alkyl ($C_1$ to $C_3$), methacrylates, and polyacrylates, such as, for example, poly(methyl methacrylate), poly(methyl acrylate), poly(ethyl methacrylate), poly(ethyl acrylate), poly(propyl methacrylate) and polyalkylene oxides such as polyethylene oxide and polypropylene oxide.

The soluble "A" block of the dispersion stabilizer comprises about 50 to about 99.9 percent by weight of the total block copolymer. The insoluble "B" block of the dispersion stabilizer comprises about 0.1 to about 50 percent by weight of the total copolymer stabilizer. The stabilizer preferably contains about 75 to about 99 percent by weight of the soluble "A" block and about 1 to about 25 percent by weight of the insoluble "B" block, from 95 to 80 weight percent of "A" and 5 to about 20 percent by weight of "B" being more preferred. If the dispersion stabilizer copolymer contains less than about 50 percent by weight of the soluble "A" block or more than about 50 percent by weight of the insoluble "B" block, the dispersion stabilizer will not provide stable flowable polymerizates at the higher desired solids in the non-aqueous dispersion medium.

The dispersion stabilizer provides within the block copolymer one segment, the insoluble "B" block which associates with the disperse polymer particles and another segment, the soluble "A" block which provides a stabilizing barrier around the main polymer particles. The association between the disperse particles and the stabilizer can be primarily associative and solubility forces. For example, in the presence of the liquid hydrocarbon dispersion medium, the insoluble block is theorized to be in a collapsed or coiled state and in this configuration probably provides an associative force between the stabilizer and the disperse polymer. Whether pendent functional groups are present or not, the block copolymer dispersion stabilizer of the invention can be used to stabilize a polymerization process and prevent agglomeration, thereby allowing a high solids content to be obtained with a lower viscosity in the resulting polymerizate.

While we do not wish to be bound by any theory, we believe that the dispersion stabilizer block copolymers of the invention allow polymerization in the non-aqueous media to occur with the formation of small polymer particles surrounded by the soluble "A" block of the stabilizer molecules. The polymerizing monomers attach by chemical bonds or association forces to the insoluble portion of the stabilizer and the growing polymer particles are prevented from agglomerating to intractable masses since the soluble "A" block of the stabilizer maintains a solubilizing sheath around the individual particles. The polymerizate becomes, in effect, a solubilized, but entropically-stabilized collection of discrete polymer particles. Since the individual particles do not agglomerate and interact only slightly, if at all, the polymerizate can contain a high solids content while simultaneously maintaining a low viscosity.

The block polymer dispersion stabilizers in accordance with the present invention can be prepared according to known block polymerization techniques utilizing heat and/or catalyst. For example, the block copolymer can be prepared in a number of types of reaction systems including solution polymerizations and non-aqueous dispersion polymerizations. It is usually preferred to prepare the block copolymer in an organic solvent. Bulk polymerization techniques may be employed using anionic polymerization techniques. Suspension and emulsion polymerizations in water could be employed if a free radical catalyst system is employed. Suspension and emulsion techniques should not be employed using anionic polymerization techniques. If an anionic copolymerization technique is employed, either block can be prepared first, when the organic solvent is a solvent for both blocks in certain cases, that is, for instance, when styrene and isoprene are employed. It is usually preferred, however, that hydrocarbon monomer be polymerized first and then the polar monomer, such as the methacrylates or alkylene oxides be added secondly. This is because the polar monomer anion is too weak a base to initiate hydrocarbon monomer polymerization. If the solvent is only a solvent for the monomer of one of the blocks, then that block has to be prepared first. Either di-, tri-, or multiblock copolymers can thus be prepared. Alternatively, the soluble and insoluble blocks can be prepared separately and then chemically combined under conditions to obtain a block copolymer having two or more distinct types of polymer blocks that are covalently bonded to each other.

According to one embodiment, a soluble "A" block polymer is formed first by homopolymerization of p-vinyl toluene in a non-aqueous medium such as, for example, tetrahydrofuran in the presence of n-butyllithium to give a polyvinyl toluene polymer. The soluble "A" block polymer thus obtained is then copolymerized with methyl methacrylate to give a polyvinyl toluene-polymethyl methacrylate copolymer. The block copolymer can be used as such as a dispersion stabilizer. Alternatively, the living polyvinyl toluene polymer can be reacted with mixtures of methyl methacrylate, or other alkyl methacrylates, and vinyl methacrylate to obtain a plurality of pendent double bonds attached to the insoluble "B" block polymer. The double bonds are thus available to allow grafting of other monomers during subsequent non-aqueous dispersion polymerization in forming the main polymer.

The dispersion stabilizer can be used in the main polymerization of the conjugated diolefin without removal of the polymer particles from the liquid organic solvent in which it is prepared, provided the solvent is satisfactory for subsequent use in the main polymerization. If the use of dry stabilizer particles is desired in the main polymerization process, conventional separation and drying procedures can be employed.

The block copolymer can be prepared according to free-radical type polymerization or ionic, preferably anionic, type polymerization. Free-radical polymerization employs a free-radical catalyst of the azo or peroxygen type. Examples of such free-radical catalysts include benzoyl peroxide, lauroyl peroxide, acetyl peroxide, cumene hydroperoxide, azobisisobutyronitrile, and dimethyl azobisisobutyronitrile. Any free-radical type catalysts which are soluble in the monomer or the liquid organic solvent, e.g., aliphatic or aromatic hydrocarbon can be employed. More than one free radical catalyst can be employed. Free-radical catalysts which are activated by other compounds including amines such as, for example, triethylenetetramine and various salts such as, for example, cobalt naphthenate can also be used. In general, any free radical catalyst that can be used for bulk or solution polymerization of the monomers herein enumerated can be employed in preparing the block copolymers for use in the process of the present invention.

When the block copolymer is prepared by the free-radical system, the initiator is used in normal catalytic amounts. In general, the initiator is used in amounts of about 0.1 to about 10 percent by weight based on the weight of the monomer or monomers. The amount employed may depend upon the method of addition and the molecular weight desired in the block copolymer dispersion stabilizer. In general, increasing the initiator concentration reduces the molecular weight of the block copolymer. Of course, the initiator can be added all at once or incrementally during the polymerization reaction. Anionic initiators allow an exact prediction of molecular weights. Either the anionic initiators are added all at once to a single monomer, or monomer mixture, or the monomer or monomer mixture is added to the initiator dissolved in the polymerization solvent. The latter procedure is preferred in commercial practice to control the polymerization exotherm.

The most readily adaptable system for preparing the block copolymer in accordance with the present invention is that of anionic polymerization. In general, the synthesis of a block copolymer by the anionic system requires the use of an organo metallo compound such as, for example, ethyllithium, n-propyllithium, isopropyllithium, n-butyllithium, sec-butyllithium, tertiary-butyllithium, n-amyllithium, isoamyllithium, phenyllithium, butylmagnesium bromide, phenylmagnesium bromide, trimethylphenylsodium or 9-fluoroenyllithium.

The block copolymer dispersion stabilizer is prepared according to conventional polymerization conditions. The temperature can vary over a rather wide range. The exact temperature employed will depend to some extent upon the particular copolymer being formed and the initiator selection. It is usually desirable to employ a pressure that is sufficient to maintain the monomeric units in the liquid phase. The pressure will thus depend upon the particular copolymer being prepared, the liquid organic solvent employed and the temperature at which the polymerization is conducted. It is necessary to conduct the anionic polymerizations in the absence of air and moisture and to conduct free-radical polymerizations in the absence of air. It is also desirable to employ purified reactants and diluents.

The molecular weight of dispersion stabilizer block copolymer may be of a wide range but preferably ranges from a molecular weight of about 2000 to about 1,500,000 with from about 2000 to about 50,000 being more preferred.

The amount of dispersion stabilizer used in the polymerization process of this invention will cause variations in the size and specific surface area of the disperse polymer. In general, the proportion of stabilizer utilized is from 0.1 to 10 percent of the weight of the conjugated diolefin monomer or monomers in the main polymerization process. Of course, smaller particles of disperse polymer require more stabilizer than large particles of disperse polymer.

In accordance with the present invention, the block copolymer dispersion stabilizer is particularly useful in the Ziegler-Natta catalyzed polymerization of conjugated diolefins such as butadiene-1,3, isoprene, and piperylene, and especially in the Ziegler-Natta catalyzed polymerization of isoprene to poly-cis-1,4-isoprene.

We have found that if a block copolymer dispersion stabilizer as defined hereinabove is used in the Ziegler-Natta catalyzed non-aqueous dispersion polymerization of a conjugated diolefin in the presence of a liquid hydrocarbon dispersion medium such as n-butane, neopentane or n-pentane, a polymerizate is obtained which contains a finely divided, freely flowing, low viscosity mixture with a solids level greater than about 12 grams per 100 cc of polymer solution (18 percent solids) and is usually within the range of about 15 to about 25 grams or higher of polymer per 100 cc of polymer solution, i.e., a solids content of about 22 to about 36 weight percent or higher. Thus, when isoprene is polymerized with a Ziegler-Natta catalyst in n-butane or neopentane medium and when the block copolymer dispersion stabilizer consists of at least one polymer "A" block which is soluble in n-butane or neopentane, such as poly-t-butyl styrene, and a covalently bound second "B" block is insoluble in n-butane or neopentane, and will produce a dispersion with the isoprene and is composed of, for instance, polymethyl methacrylate or a mixture of polymethyl methacrylate-copolyvinyl methacrylate, a polymerizate comprising poly-cis-1,4-isoprene results which is finely divided, free flowing, low viscosity mixture having a solids level greater than 16 grams per hundred cc of polymer solution i.e., a solids content greater than 24 weight percent.

Surprisingly, we have found that polar moieties such as polar methyl methacrylate moieties, can be incorporated into block copolymer dispersion stabilizers which are useful in the polymerization of conjugated diolefins using a Ziegler-Natta catalyst system in a non-aqueous dispersion medium. In some cases, these polar moieties do reduce the reaction rate slightly. On the other hand, the incorporation of these polar moieties into the block copolymers provides excellent stabilizers for the non-aqueous dispersion polymerization. They provide greater concentrations of finely divided free-flowing stereoregular polyconjugated diolefin rubber particles in the dispersion medium. For instance, when isoprene is polymerized with a mixture of titanium tetrachloride and triisobutylaluminum using an n-butane dispersion medium in the presence of stabilizers containing polar moieties, there is produced cis-1,4-polyisoprene particles with molecular weights and cis contents equivalent to solution produced cis-1,4-polyisoprene in a control solution polymerization system in n-butane without the use of the block copolymer stabilizers. The use of the block copolymer stabilizers in the non-aqueous dispersion process allows a much higher concentration of the polyisoprene to the dispersion medium than do equivalent conventional solution polymerization techniques because the use of the block copolymer stabilizer allows the polymerization to be a non-aqueous dispersion polymerization instead of a solution polymerization. The viscosity of the non-aqueous dispersion is much less than the same concentration of a cement in the conventional solution polymerization.

Liquid Organic Medium To Form The Block Copolymer Dispersion Stabilizer

When the block copolymer dispersion stabilizer is formed in an organic liquid, the organic liquid can be selected from a wide variety of materials. The organic liquid may be the same or different from the liquid hydrocarbon dispersion medium used in the main polymerization of the conjugated diolefin monomer. It is preferable that the organic liquid be one in which the monomer or monomers used are soluble and that it is chemically inert in the subsequent polymerization reaction. It should further be selected on the basis of its boiling point if the polymerization is carried out under reflux conditions. Examples of organic liquids which can be used in forming the block copolymer dispersion stabilizer include saturated and unsaturated aliphatic and cycloaliphatic, aromatic and naphthenic hydrocarbons. Specific examples of these hydrocarbons are propane; n-butane; n-pentane; neopentane; n-hexane; neohexane; n-heptane; n-octane; nonane; decane; undecane; dodecane; tridecane; cyclopentane; cyclohexane; benzene; and mixtures of the foregoing including mineral oil and refined kerosene. Certain polar solvents may be used, for instance, ethers such as ethyl ether, butyl ether, dioxane and tetrahydrofuran. It should be understood that not all of the above solvents are equally satisfactory in forming all block copolymer dispersants. Various ratios of solvent to monomer can be used. It is generally desirable to use an amount of solvent in excess of the amount of monomer or monomers, for example, the use of about 1 to about 100 times as much solvent as total monomer by volume is suitable.

MAIN POLYMERIZATION OF CONJUGATED DIOLEFIN MONOMER

Conjugated Diolefin Monomer

In the non-aqueous dispersion polymerization process of the present invention for polymerizing a conjugated diolefin monomer in a liquid hydrocarbon dispersion medium with a Ziegler-Natta catalyst in the presence of a block copolymer dispersion stabilizer, the conjugated diolefin monomer may be a single conjugated diolefin hydrocarbon or it may be a mixture of any two or more of such conjugated diolefin hydrocarbons. The conjugated diolefin hydrocarbon may be selected from butadiene-1,3; 2-methylbutadiene-1,3 (isoprene); pentadiene-1,3(piperylene); 2,3-dimethyl-butadiene-1,3; 2-ethyl-butadiene-1,3; 4-methylpentadiene-1,3; 2-methylpentadiene-1,3; hexadiene-2,4; 4-methyl-hexadiene-1,3; 2-methyl-hexadiene-2,4; 2,4-dimethylpentadiene-1,3; 2-isopropyl-butadiene-1,3; 1,1,3-trimethyl-butadiene-1,3; octadiene-2,4; 2,5,5-trimethyl-hexadiene-1,3; 2-amyl-butadiene-1,3; 1,1-dimethyl-3-tertiary-butyl-butadiene-1,3; 2-neopentyl-butadiene-1,3; phenyl-butadiene-1,3; and 2,3-diphenyl-butadiene-1,3.

Preferred conjugated diolefin monomers which are used in forming the main polymer in accordance with the invention are the conjugated diolefins selected from butadiene-1,3, 2-methyl-butadiene-1,3(isoprene), 2,3-dimethyl-1,3-butadiene, and pentadiene-1,3 (piperylene).

Liquid Hydrocarbon Dispersion Medium for the Main Polymerization

In the non-aqueous dispersion polymerization process of the present invention for polymerizing a conjugated diolefin monomer in a liquid hydrocarbon dispersion medium in the presence of a block copolymer dispersion stabilizer with a Ziegler-Natta catalyst, the liquid hydrocarbon dispersion medium can be selected from a variety of materials depending upon the particular conjugated diolefin to be polymerized. It should be selected on the basis of its boiling point and solubility parameters if the polymerization is carried out under reflux conditions. It should also be a hydrocarbon that is chemically inert in the polymerization reaction. The liquid hydrocarbon may be selected from the saturated aliphatic hydrocarbons including propane, n-butane, isobutane, n-pentane, isopentane, neopentane, n-hexane, isohexane, neohexane, 2,3-dimethylbutane, n-heptane, isoheptane, n-octane, isooctane, nonane, isononane, decane, undecane, dodecane, tridecane, trimethyldodecane and the like. It will be understood that not all of the above enumerated liquid hydrocarbon dispersion media are equally satisfactory in carrying out the main polymerization. When polymerizing butadiene-1,3 or isoprene, the preferred hydrocarbon dispersion medium is selected from n-butane, neopentane and mixtures of isomeric pentanes. Notwithstanding the superiority of n-butane, neopentane and mixed isomeric pentanes in the non-aqueous dispersion polymerization of isoprene with a Ziegler-Natta catalyst, we have found that the mere substitution of n-butane, neopentane or mixed isomeric pentanes for n-hexane in conventional solution polymerization of isoprene with a Zeigler-Natta catalyst does not give the same advantageous results of our non-aqueous dispersion polymerization process. For example, we have found that if solution polymerization of isoprene is conducted with a Ziegler-Natta catalyst using n-butane or neopentane instead of n-hexane as the solvent, the poly-cis-1,4-isoprene that is formed immediately precipitates on the surfaces of the reactor as an insoluble, immobile, tightly adhering polymer coating which clings tenaciously to the reactor surface and cannot be stirred or pumped out of the reactor.

The amount of the liquid hydrocarbon dispersion medium which can be used can be widely varied. It is generally desirable to use an amount of dispersion medium in excess of the amount of conjugated diolefin monomer. For example, the use of about 1 to about 5, preferably about 1 to about 2 times as much dispersion medium as conjugated diolefin monomer by volume is suitable.

Catalyst System

In the non-aqueous dispersion polymerization process of the present invention for catalytically polymerizing a conjugated diolefin monomer in a liquid hydrocarbon dispersion medium in the presence of a block copolymer dispersion stabilizer, the catalyst is of the Ziegler-Natta type. In general, the Ziegler-Natta type catalysts comprise organo metallo complex catalyst systems which are obtained when a compound of a heavy metal in the 4th to 6th positions of the long periods of the Periodic Table is reacted with an organometallic derivative of a metal of the first three groups of the periodic system (most commonly aluminum, although zinc, cadmium and lithium have also been used). The heavy metals are those of the periodic groups IV-B, V-B, and VI-B, including titanium, zirconium, hafnium, vanadium, niobium, tantalum, chromium, molybdenum and tungsten as well as metals in the so-called "actinium series" such as thorium and uranium. The preferred heavy metal compounds are the salts of the formula M(A)n wherein M is the heavy metal atom, A is a monovalent anion and n is the maximum valence of M. Especially preferred are the halides (chlorides, bromides, iodides and fluorides) and acetylacetonates of titanium, zirconium, thorium and uranium with titanium chlorides being most preferred. Other heavy metal compounds include other inorganic salts such as oxyhalides, sulfates, nitrates, sulfides and the like and other salts such as acetates and oxalates of the above group. Most of these catalysts are characterized by the formation of a finely divided precipitate consisting of a complex mixture containing lower valence compounds of the heavy, or transition metal.

In U.S. Pat. Nos. 3,170,907, 3,856,764 and 3,910,869 there is disclosed that nickel compounds can be employed along with a fluorine containing compound and an organo-aluminum compound to polymerize conjugated diolefins. Among the nickel compounds which may be employed are those nickel salts of carboxylic acids, organic complex compounds of nickel, nickel tetracarbonyl, representative of which are nickel benzoate, nickel acetate, nickel naphthenate, nickel octanoate, bis (alpha-furyl dioxime)nickel, nickel palmitate, nickel stearate, nickel acetylacetonate, nickel salicaldehyde, bis(salicylaldehyde) ethylene diimine nickel, bis (cyclopentadiene)nickel, cyclopentadienyl nickel nitrosyl, nickel ethyl benzoate and nickel carbonyl.

Among the fluorine containing compounds mentioned in these patents are hydrogen fluoride and boron trifluoride. Both hydrogen fluoride and boron trifluoride may be complexed with various complexing agents. For instance, hydrogen fluoride complexes can be prepared by complexing hydrogen fluoride with a member of the class consisting of ketones, esters, ethers, alcohols, and nitriles. Thus, representative of ketones which may be complexed with hydrogen fluoride are dimethyl ketone, methyl ethyl ketone, dibutyl ketone, methyl isobutyl ketone, 2,4-pentane dione, acetophenone, benzophenone, quinone and the like. The nitrile sub-class can be representative by the class RCn where R is an alkyl, cycloalkyl, aryl, alkaryl, arylalkyl which contain up to about 30 carbon atoms. Representative of the class of nitrile compounds which can be complexed with hydrogen fluoride are acetonitrile, butyronitrile, acrylonitrile, phenyl acetonitrile and the like. The alcohols which can be employed to form the complexes with HF are represented by methanol, ethanol, n-propanol, i-propanol, phenol, cyclohexanol, butanol, hexanol and pentanol. The ether sub-class can be defined by the formula R'OR where R and R' represent alkyl, cycloalkyl, aryl, alkaryl, arylalkyl radicals containing up to about 30 carbon atoms; R and R' may be the same or dissimilar and the R's may be joined through a common carbon bond to form a cyclic ether with the integral part of the cyclic structure such as tetrahydrofuran, furan or dioxane. Representative of other ethers are dimethyl, diethyl, dibutyl, diamyl, diisopropyl, anisole, diphenyl ethyl methyl, dibenzyl ethers. The ester subclass can be defined by the formula

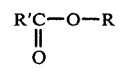

where the R' and R are alkyl, cycloalkyl, alkaryl, arylalkyl and aryl radicals containing up to 20 carbon atoms. Representative of such esters are ethyl benzoate, amyl benzoate, phenyl acetate, phenyl benzoate and the like. The aforementioned complexing agents have been set forth as being capable of being complexed with hydrogen fluoride. Likewise, such materials can be complexed with boron trifluoride as well to form the fluorine containing component.

Ziegler-Natta catalysts are well-known in the art. Therefore, the Ziegler-Natta catalysts, per se, and their method of preparation do not constitute a part of the present invention. While Ziegler-Natta catalysts and their preparation are described in numerous patents, including many of those reviewed in the "Background of the Invention" hereinabove, the Ziegler-Natta catalysts and their preparation are exemplified by the disclosures in U.S. Pat. Nos. 3,047,559; 3,114,743; and 3,178,402.

In U.S. Pat. No. 3,047,559 to R. H. Mayor et al (The Goodyear Tire & Rubber Company), a Ziegler-Natta type catalyst is disclosed which comprises a complex or reaction product of titanium tetrachloride and an organo aluminum compound of the general formula:

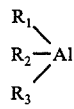

in which $R_1$ is selected from alkyl, aryl, and aralkyl, groups and $R_2$ and $R_3$ are selected from alkyl, aryl and aralkyl groups and hydrogen and with the etherates of such organo aluminum compounds. Representative examples of such compounds are ethylaluminum dihydride, n-propylaluminum dihydride, n-butylaluminum dihydride, isobutylaluminum dihydride, phenylaluminum dihydride, p-tolylaluminum dihydride, benzylaluminum dihydride, diethylaluminum hydride, di-n-propylaluminum hydride, di-n-butylaluminum hydride, diisobutylaluminum hydride, diphenylaluminum hydride, di-p-tolylaluminum hydride, dibenzylaluminum hydride, phenyl ethylaluminum hydride, phenyl n-propylaluminum hydride, phenyl isopropylaluminum hydride, p-tolyl ethylaluminum hydride, p-tolyl n-propylaluminum hydride, p-tolyl isopropylaluminum hydride, benzyl ethylaluminum hydride, benzyl n-propylaluminum hydride, benzyl isopropylaluminum hydride, trimethylaluminum, tri-n-propylaluminum, triisopropylaluminum, tri-n-butylaluminum, triisobutylaluminum, tri-n-amylaluminum, triisoamylaluminum, tri-n-hexylaluminum, triisohexylaluminum, tri-n-octylaluminum, triisooctylaluminum, tri-n-decylaluminum, tri-n-dodecylaluminum, triphenylaluminum, tri-p-tolylaluminum, tribenzylaluminum, ethyl diphenylaluminum, ethyl di-p-tolylaluminum, ethyl dibenzylaluminum, diethyl phenylaluminum, diethyl p-tolylaluminum and diethyl benzylaluminum and the etherate complex materials such as the complexes with dimethyl ether, diethyl ether, di-n-propyl ether, diisopropyl ether, di-n-butyl ether, diisobutyl ether, diamyl ether, methyl phenyl ether (anisole), ethyl phenyl ether (phenetole), n-butyl phenyl ether, isobutyl phenyl ether, n-amyl phenyl ether, isoamyl phenyl ether, n-hexyl phenyl ether, n-heptyl phenyl ether, diphenyl ether, benzyl methyl ether, benzyl ethyl ether, benzyl n-butyl ether, benzyl n-butyl ether, benzyl isobutyl ether, dibenzyl ether, ethyl o-tolyl ether, and n-butyl o-tolyl ether. Representative examples of such etherates are ethylaluminum dihydride diethyl etherate, n-propylaluminum dihydride diethyl etherate, isopropylaluminum dihydride di-n-propyl etherate, phenylaluminum dihydride dibutyl etherate, p-tolylaluminum dihydride diisopropyl etherate, benzyaluminum dihydride diisobutyl etherate, phenyl ethylaluminum hydride diethyl etherate, p-tolyl ethylaluminum hydride diethyl etherate, benzyl ethylaluminum hydride diethyl etherate, triethylaluminum diethyl etherate, triisobutylaluminum diethyl etherate, triphenylaluminum di-p-propyl etherate, tri-p-tolylaluminum dibutyl etherate and tribenzylaluminum diisopropyl etherate.

According to said U.S. Pat. No. 3,047,559, the etherates such as diethyl etherate are generally formed by reacting an organo magnesium halide with an aluminum halide in ether. They can also be formed by adding the organo aluminum compound to an ether. Specific examples of complex catalyst systems of the type disclosed in said U.S. Pat. No. 3,047,559 are triethylaluminum-titanium tetrachloride, tri-n-propylaluminum-titanium tetrachloride, triisobutylaluminum-titanium tetrachloride, tri-n-octylaluminum-titanium tetrachloride and triethylaluminum-ethyl etherate-titanium tetrachloride.

In U.S. Pat. No. 3,114,743, to S. E. Horne, Jr. (Goodrich-Gulf Chemicals, Inc.), a Ziegler-Natta type catalyst is disclosed which comprises the complex product obtained when reacting (a) a compound of a heavy metal occurring in the 4th to 6th positions of the long periods of the Periodic Table and (b) an organoaluminum compound of the general formula:

wherein R' is a hydrocarbon radical, R" is either another R' radical or an —OR' radical or a hydrogen, or halogen atom and R'" is another R' radical or hydrogen. The most preferred organo-aluminum compounds are aluminum trialkyls, Al(R)$_3$, wherein each R is an alkyl such as ethyl, propyl, butyl, isobutyl, amyl, hexyl, octyl, dodecyl, etc., or a substituted alkyl such as phenylethyl, 2-phenylpropyl, etc. Other organo-aluminum compounds are the alkyl aluminum hydrides, $(R)_mAl(H)_n$ wherein R is the same as above and m and n are integers totaling 3; the dialkyl aluminum halides $R_2AlX$ wherein X is a halogen atom including chlorine, bromine, iodine and fluorine, and R is the same as above; the dialkyl aluminum alkoxides $R_2AlOR$ wherein R is the same as above; and the organo-aluminum compounds of the above-type formulae wherein R represents, in place of alkyl, an aryl group, such as phenyl, or a cycloalkyl group such as cyclohexyl or any other hydrocarbon group.

The reaction is carried out by simply mixing the heavy metal compound, most preferably titanium tetrachloride, and the organo-aluminum compound, most preferably an aluminum trialkyl, in proportions such as to provide substantially equi-molecular amounts of heavy metal and aluminum, at any desired temperature, preferably at room temperature and, if desired, in the presence of an inert hydrocarbon diluent or solvent such as a saturated alkane, among which are cetane, hexane, heptane or the like or mixtures thereof such as kerosene, or the mixture of alkanes resulting from the "Fischer-Tropsch" process, or a cycloalkane such as cyclohexane or methylcyclohexane, or a benzene hydrocarbon such as benzene, toluene or xylene. It is important that the hydrocarbon solvent or diluent be free from oxygen and water, and that these materials be excluded from the reaction mixture during the reaction.

The reaction leading to the formation of the catalyst is generally rapid and exothermic and is accompanied by the development of color in the reaction mixture. For example, when one mole of titanium tetrachloride is introduced into a hexane solution of one mole of aluminum triethyl, in the absence of oxygen and water, the solution assumes a dark color with the formation of a black difficulty soluble material of unknown structure but believed to be a compound of titanium in which the titanium exhibits a valence less than four. The resulting black material is a typical heavy metal catalyst for use in the process of the present invention. A similar material is produced when there is used, in place of aluminum triethyl, an aluminum trialkyl in which the alkyl groups contain 3 or more carbon atoms such as aluminum tri-n-propyl, aluminum triisobutyl, aluminum tri-n-octyl and the like.

According to said U.S. Pat. No. 3,114,743, it is important when producing an all poly-cis-1,4-isoprene that the relative proportions of heavy metal compound and organo aluminum compound be rather closely controlled. It is most desirable to use one mole of trialkyl aluminum compound for each mole of heavy metal compound, preferably titanium tetrachloride, to give a ratio of heavy metal to aluminum of 1 to 1. It is reported that this ratio can vary within the limits of 0.5:1 to 1.5:1. When employing titanium tetrachloride and dialkyl aluminum halides, the Ti/Al molar ratio is more preferably in the range of 0.5:1 to 1:1.

In U.S. Pat. No. 3,178,402 to D. R. Smith et al (Phillips Petroleum Company), another catalyst system of the Zeigler-Natta type is disclosed. The catalyst system comprises (a) a trialkylaluminum and (b) titanium tetraiodide. The trialkylaluminum is represented by the formula $R_3Al$, where R is an alkyl radical containing up to and including 6 carbon atoms. The alkyl groups can be either straight or branched chain alkyls, for example, ethyl, propyl, isopropyl, n-butyl, isobutyl, amyl, n-hexyl or isohexyl. The alkyl groups can be the same or different. For example, the trialkylaluminum compound can be diisobutyl-monoethylaluminum. The trialkylaluminum compounds which are preferred are triethylaluminum and triisobutylaluminum since these compounds have high activity. Mixtures of various trialkylaluminum compounds can also be used.

The amount of trialkylaluminum compound that is used in the catalyst system is within the range of 1.25 to 50 mols per mol of titanium tetraiodide. A preferred ratio comprises from 1.5 to 35 mols of trialkylaluminum per mol of titanium tetraiodide. When triisobutylaluminum is used in the catalyst system, a preferred ratio is from 1.7 to 35 mols of triisobutylaluminum per mol of titanium tetraiodide. When triethylaluminum is used in the catalyst system, a preferred ratio is from 1.5 to 10 mols of triethylaluminum per mol of titanium tetraiodide.

The amount of Ziegler-Natta catalyst which is to be used in a non-aqueous dispersion polymerization of diolefin monomers in accordance with the process of the present invention can vary over a wide range. The amount of catalyst is usually expressed in parts per hundred of monomer (phm). The parts of catalyst are calculated on the basis of the total weight of the catalyst employed, all catalyst components being taken into consideration. The amount of catalyst usually is in the range of about 0.5 to about 10 phm and more preferably in the range of from about 0.1 to about 1 phm.

The mole ratio of the catalyst components to each other can also vary over a wide range. The teachings found in the prior art patents heretofore mentioned will provide adequate disclosure on how to prepare the Ziegler-Natta catalyst useful in this invention. These prior art patents also teach the molar ratio of each of the various Ziegler-Natta catalyst components to each other.

The concentration of the conjugated diolefin in the liquid organic dispersion medium should be as high as possible commensurate with the ability to control the viscosity of the dispersion in the non-aqueous medium so as to provide proper temperature control and movement of the polymeric conjugated diolefin dispersion in the non-aqueous dispersion medium.

Suitable non-aqueous dispersion mediums for conducting the process of this invention are usually butane, pentane, neopentane, and mixtures with aliphatic hydrocarbons. While it may be possible to utilize an aromatic solvent system, it is unlikely that one could possibly do so because of the solubilizing characteristics of aromatic hydrocarbons generally which would cause polymerized conjugated diolefin polymer to become soluble in these aromatic solvents rather than forming a non-aqueous dispersion.

Reaction Conditions

The dispersion polymerization process of the present invention is carried out under conventional non-aqueous dispersion polymerization temperatures, pressures, and reaction times. Polymerization reactions can be conducted over a wide range of temperatures, for example, in the range of −80° to 150° C. However, it is preferred to carry out the process at a temperature in the range of −20° to 125° C., and more desirably at a temperature in the range of 25° to 80° C. The exact temperature employed will depend to some extent upon the monomer being polymerized and the catalyst being used. Generally, the temperature is controlled to avoid a rapid, uncontrollable exotherm during polymerization, and to avoid such a high temperature as to preclude the grafting of a portion of the monomer upon the dispersion stabilizer. The polymerization reaction can be conducted under autogenous pressure. It is usually desirable to operate at a pressure sufficient to maintain the monomeric materials substantially in the liquid phase. The pressure will thus depend upon the particular conjugated diolefin monomer being polymerized, the liquid hydrocarbon dispersion medium, i.e., n-butane or neopentane with isoprene, and the temperature at which the polymerization is conducted. It is important to conduct the polymerization in the absence of air and moisture. In general, the polymerization is carried to as high a conversion as is practical in a suitable period of time. Conversions of about 50 to about 90 or 98–99 percent can be obtained in a period of one-half hour to eight hours depending upon the particular conjugated diolefin monomer or monomers, initiators or catalysts, and proportions of the various materials employed.

At the completion of the polymerization reaction, the total reaction mixture is treated with a catalyst deactivation agent such as an alcohol or an amine. The polymer of the conjugated diolefin is then removed from the reaction medium. This removal of the polymer from the non-aqueous dispersion medium can be performed in a number of ways. Since the polymer is dispersed in the non-aqueous dispersion medium, the polymer can be allowed to settle and the excess dispersion medium decanted. Still another method of removal of the polymer from the dispersion medium is stripping by the use of heat. In such a process, the polymer is pumped into a closed vessel containing water at about its boiling point and the excess conjugated diolefin and the non-aqueous dispersion medium is flashed off and the polymer dried in any conventional manner. The removal of the polymer from the non-aqueous dispersion medium is well known to those skilled in the art of polymerization of conjugated diolefins and need not be discussed further here.

The rubbery polymers which result when butadiene-1,3 or isoprene is polymerized in accordance with the process of the invention can be compounded by any of the known methods such as have been used for compounding natural rubber. Vulcanization accelerators, reinforcing agents and fillers such as have been used in natural rubber can likewise be employed when compounding the polymers obtained in the process of this invention.

The practice of this invention is further illustrated by reference to the hereinbelow specific examples which are intended to be representative rather than restrictive of the scope of the invention.

In Examples 1 through 33 which are directed to the preparation of the block copolymer dispersion stabilizers, a calculated amount of an initiator such as, for example, n-butyllithium and a calculated amount of one of the monomers such as, for example, p-vinyl toluene to give a certain block length are charged to a reaction vessel. Polymerization results in the formation of one block, e.g., polyvinyl toluene which is the soluble "A" block. In the second step of the stabilizer preparation, a second monomer such as, for example, methyl methacrylate to form the insoluble "B" block is added to the living anion of the first "A" block to form the desired block copolymer, e.g., polyvinyl toluene-b-methyl methacrylate.

Reference is now made to the specific illustrative examples.

PREPARATION OF BLOCK COPOLYMER DISPERSION STABILIZER

EXAMPLE 1

Polyvinyl Toluene-b-Methyl Methacrylate

A 2-liter, water-cooled Pyrex reaction vessel equipped with a magnetic stirrer is charged with 1.5 liter of calcium hydride-dried tetrahydrofuran (THF) through a septum via hypodermic syringe. The THF is stirred and purged overnight with an argon stream bubbled through a hypodermic needle (18 gage) inserted below the liquid surface. Residual impurities in the THF solvent are then removed by titration with n-butyllithium to a yellow-orange endpoint using p-vinyl toluene as the indicator. Two-hundred and fifty ml (230 g) of high purity p-vinyl toluene (distilled at 36°

C./3 torr., over calcium hydride, and then purged with an argon sparge to remove dissolved air) is added via hypodermic syringe while the temperature of the reaction mixture is lowered to −78° C. with a dry ice/acetone bath while the argon purging is continued and then the well-stirred p-vinyl toluene solution is initiated by the rapid addition of 18.98 ml (0.102 g/ml) of n-butyllithium. Immediately a dark red-orange color develops and a rapid increase in viscosity is noted. The solution is stirred for 10 minutes and then 8.88 ml of 1,1'-diphenylethylene, equivalent to 1.76 times the number of polymer chains, is injected via microsyringe. This insures a subsequent reaction at the methacrylate carbon-carbon double bond instead of the ester carbonyl (D. Freyss, P. Rempp and H. Benoit, J. Polymer Sci., Polymer Letters, 2, 217 (1964)). The color immediately changes to a burgundy red. A sample of polymer solution is removed for molecular weight characterization via hypodermic syringe and quenched in methyl alcohol. The product is a homopolymer of p-vinyl toluene and comprises block A of the copolymer to be formed. The homopolymer thus obtained has a GPC (determined in THF at 25° C.) weight average molecular weight ($\overline{M}_w$) of 13,960 and a number average molecular weight ($\overline{M}_n$) of 9,500. The measured $\overline{M}_w/\overline{M}_n$ ratio is therefore 1.47. This apparent molecular weight distribution is largely due to GPC spreading. This is indicated by the fact that the GPC molecular weight on a narrow molecular weight distribution polystyrene standard (ARRO Laboratories, Catalog 300-3, calibration data $\overline{M}_w = 19,850$; $\overline{M}_n = 19,650$; $\overline{M}_w/\overline{M}_n = 1.01$) is $\overline{M}_w = 19,930$ and $\overline{M}_n = 15,750$, with $\overline{M}_w/\overline{M}_n = 1.26$.

In a separate procedure, carried out before the presently described anionic polymerization experiment, methyl methacrylate was rigorously purified. It was washed with 5 percent aqueous NaOH solution to remove polymerization inhibitor, washed with distilled water until the wash water was neutral in a litmus test, pre-dried over anhydrous $CaSO_4$ (Drierite ®), dried over $CaH_2$ to remove the last traces of water, and distilled from sodium benzil at <1 torr and a temperature slightly above the freezing temperature (−48° C.) of methyl methacrylate. The sodium benzil was first prepared by reacting sodium metal with benzil in a 1:1 mole ratio in THF to produce a deep blue solution, then removing the THF solvent by distillation at <1 torr. The amount of this methyl methacrylate (13.50 ml, 12.73 gm) required to produce a block copolymer containing about 5 weight percent of bound methyl methacrylate is then injected over a 15 minute period into the well-stirred reaction mixture via hypodermic syringe. The addition of approximately 2.8 ml of MMA causes the deep red color to fade to a yellow "living" methacrylate anion color. After all the methyl methacrylate is added, the reaction mixture is stirred for another 10 minutes. The viscous polymer solution is warmed to ambient temperature and the polymer product is recovered by precipitation in methyl alcohol. The white polymer product is filtered, washed with methyl alcohol, air dried and then vacuum dried at 50° C. to insure removal of absorbed alcohol prior to use as a stabilizer such as in the Ziegler-Natta isoprene polymerizations. The yield is 235 g (Theory, 240 g, or 98.5 percent). The polymer comprises a theoretical 95/5, weight ratio of polyvinyl toluene-b-methyl methacrylate copolymer with a theoretical molecular weight of 8730. The block copolymer actually obtained has a GPC measured $\overline{M}_w$ of 13,970 and a $\overline{M}_n$ of 9650. The measured $\overline{M}_w/\overline{M}_n$ ratio is therefore 1.45. This block copolymer dissolves or disperses in heptane at ambient temperature to produce a very faintly opalescent solution while a sample of the poly-p-vinyl toluene homopolymer (block A) dissolves to give a clear solution. In addition, an infrared (IR) spectrum of the final block copolymer product shows a small, sharp ester carbonyl absorption at 1730 $cm^{-1}$, while the IR spectrum of block A poly-p-vinyl toluene homopolymer shows no absorption of this frequency. These results indicate that a covalently linked block copolymer of heptane soluble poly-p-vinyl toluene and heptane insoluble polymethyl methacrylate was obtained.

EXAMPLE 2

Polyisoprene-b-Styrene

A 2-liter, water-cooled Pyrex reaction vessel equipped with a magnetic stirrer is charged with 1 liter of calcium hydride-dried benzene and 0.5 ml of tetrahydrofuran. The benzene is stirred and purged overnight with a slow stream of argon introduced through a needle-septum inlet and a long tubing outlet. The contents of the reaction vessel are cooled to about 10° C. after which 145 ml (93.7 g) of calcium hydride-dried isoprene is added via hypodermic syringe through a septum. Argon purging is continued for several hours (2 to 3 hours) and then the well-stirred isoprene solution is titrated to a pale yellow color using about 1000 microliters of 15 percent n-butyllithium solution, introduction thereof being by means of a microsyringe. Thereafter, an additional 1000 microliters of n-butyllithium is injected rapidly whereupon a clean, moderate intensity yellow color is obtained. After 20 minutes, the required amount, 30 ml, 27.3 g of high-purity styrene is added with little change in color noted. A slow temperature increase from 20° to 29° C. (water circulation to the reactor jacket turned off) is observed over a 1 to 2-hour period, with the color gradually intensifying to orange as styrene begins to polymerize. The reaction mixture is stirred overnight at ambient temperature, while continuing a slow argon purge. Then the clear, orange polymer is titrated to colorless using about 275 microliters of methyl alcohol (which corresponds to a 28,200 number-average molecular weight). The product is freeze-dried to obtain a 128 g (100 percent theory) of light yellow, clear, syrupy liquid polymer. The polymer comprises a 77/23 polyisoprene-b-styrene copolymer. The block copolymer thus obtained has a GPC (determined in THF at 25° C.) weight average molecular weight of 31,800 and a number-average molecular weight of 22,900. The experimental $\overline{M}_w/\overline{M}_n$ ratio is 1.39.

EXAMPLE 3

Polyisoprene-b-Methyl Methacrylate

In the same manner as Example 1, 1.5 liter of THF, purified, purged with argon and dried over $CaH_2$, is charged into a 2-liter, Pyrex reaction vessel. A continuous, slow argon purge is maintained as in Example 1. Impurities are removed by titrating, in the presence of 100 microliters of diphenyl ethylene (as indicator), with 2.8 ml of n-butyllithium solution (0.102 g/ml). Then, 8.6 ml further butyllithium solution is injected, the solution cooled to −78° C., and 294 cc (200 g) of purified isoprene is added. No polymerization (as evidenced by lack of precipitation of aliquots in methanol) occur in 1 hour. The solution is warmed to 30° C., where an exotherm is noted. The reaction heat is moderated by a cold water jacket, maintaining a 35° to 45° C. temperature for 30 minutes. An aliquot removed from the reaction at this time revealed the reaction to form block A was complete. The GPC (determined in THF at 25° C.) molecular weight data obtained for this A block of polyisoprene are the following: $\overline{M}_w = 40{,}000$; $\overline{M}_n = 26{,}900$; $\overline{M}_w/\overline{M}_n = 1.49$. The polyisoprene should have a structure that approximates 0 to 33 percent trans 1,4; 51 to 74 percent 3,4 and 16 to 32 percent 1,2 (S. Bywater, "Polymerization Initiated by Lithium and Its Compounds", Adv. Polymer Sci., 4, 101 (1965)), when polymerized in the THF solvent. Indeed, the experimental IR spectrum of the polyisoprene A block contains characteristic carbon-carbon double bond unsaturation absorptions at 840 cm$^{-1}$ and 1670 cm$^{-1}$ (trans 1,4), at 890 cm$^{-1}$ and 1643 cm$^{-1}$ (3,4), and at 910 cm$^{-1}$ and 1653 cm$^{-1}$ (1,2). A 3.0 ml quantity 1,1'-diphenylethylene (1 equivalent based on n-butyllithium initiator) is added, the reaction vessel and its contents are chilled to $-78°$ C., and 55.0 ml (51.6 g) of methyl methacrylate rigorously purified as in Example 1, is injected from a hypodermic syringe over 30 minutes as the solution gradually warms to about 0° C. The viscosity increases as methyl methacrylate is added. The product is isolated by precipitation in methanol, followed by dissolution in benzene and freeze-drying, to obtain a nearly quantitative yeield of a theoretical 79/21, weight ratio, of isoprene/methyl methacrylate block copolymer. GPC molecular weight analysis shows a single product (symmetrical, monomodal GPC curve) with the following molecular weight parameters: $\overline{M}_w = 48{,}700$; $\overline{M}_n = 33{,}700$; and $\overline{M}_w/\overline{M}_n = 1.44$. This block copolymer dissolves or disperses in n-heptane at ambient temperature to produce an opalescent solution, while a sample of polyisoprene homopolymer (block A) dissolves to give a clear solution. Likewise, the final block copolymer product dissolves or disperses in an 80/20 (volume ratio) mixture of either n-pentane and isoprene or butane and isoprene to give a cloudy or opalescent solution. Also, the IR spectrum of the final block copolymer product shows a strong ester carbonyl absorption at 1730 cm$^{-1}$ in addition to the carbon-carbon double bond absorptions found in the block A polyisoprene. These data indicate that a covalently linked block copolymer was obtained.

EXAMPLE 4

Polyvinyl Toluene-b-Styrene

A 2-liter, water-cooled Pyrex reaction vessel equipped with a magnetic stirrer is charged with 1.2 liter of calcium hydride-dried benzene. The benzene is stirred and purged overnight with a slow stream of argon introduced through a needle-septum inlet and a long tubing outlet. The contents of the reaction vessel are cooled to about 10° C. after which 20 ml (18.2 g) of high-purity styrene and 4 ml of tetrahydrofuran are added. Argon purging is continued for 6 hours and then the well-stirred styrene solution is titrated to a scarlet color by the addition of 8 ml of n-butyllithium in a one shot addition. In a period of about 10 minutes, the temperature increases from 25 to 29° C. (water circulation in the water jacket turned off). After 1 hour, 181 ml of p-vinyl toluene (distilled at 36/3 torr, over calcium hydride) are injected with little change in color noted. The reaction mixture is stirred for 5 hours at ambient temperature, while continuing a slow argon purge. The polymer is then titrated with 475 microliters of methyl alcohol. The product is freeze dried to obtain 184 g (100 percent theory) of a white powder that is insoluble in pentane and heptane but soluble in a hot (50° C.) 80/20 butane/isoprene (volume ratio) mix. The polymer comprises a 90/10 polyvinyl toluene-b-styrene copolymer. The block copolymer thus obtained has a GPC (determined in THF at 25° C.) weight-average molecular weight of 16,800 and a number average molecular weight of 12,500. The experimental $\overline{M}_w/\overline{M}_n$ ratio is 1.35.

EXAMPLE 5

Poly-t-Butylstyrene-b-Styrene-co-Isoprene

A 125 cc Pyrex vial is charged with 9.28 g of t-butylstyrene dissolved in 100 ml of calcium hydride-dried benzene and 500 microliters of a 15 percent n-butyllithium solution in heptane as initiator under conditions to avoid the introduction of oxygen or moisture. The reaction product, a "living" poly(t-butylstyrene), is obtained in less than 10 minutes at ambient temperature and the polymerization is noticeably exothermic. The orange "living" polymer is cooled with an ice/water bath while 9.2 g of styrene and 0.6 g of isoprene is added using a hypodermic syringe over a 10-minute period. The mixture is then stirred for an additional 15 minutes. The polymerization is then terminated by the addition of 0.035 ml of ethyl alcohol to effect a capping of the polymer chains with hydrogen. The product is freeze-dried to obtain 17.2 g of white polymer (theory 19.0 g). The polymer comprises a 51/49, t-butylstyrene/styrene-co-isoprene block copolymer having a GPC (determined in THF at 25° C.) weight average molecular weight ($\overline{M}_w$) of 23,810. The number average molecular weight ($\overline{M}_n$) is 17,700. The experimentally determined $\overline{M}_w/\overline{M}_n$ ratio is 1.34.

EXAMPLE 6

Poly-t-Butylstyrene-b-Methyl Methacrylate-co-Vinyl Methacrylate

A 125-cc Pyrex vial is charged with 8.5 g of t-butylstyrene dissolved in 75 ml of tetrahydrofuran purified rigorously to exclude oxygen and moisture. To this solution is added 385 microliters of a 15 percent n-butyllithium solution in heptane as initiator under conditions to avoid the introduction of oxygen and moisture. The reaction product, a "living" poly(t-butylstyrene), is obtained in 10 minutes at ambient temperature. The polymerization exotherm reaches a peak ($\sim 40°$ C.) in about 4 minutes. To the "living" polymer is added 257 ul of 1,1'-diphenylethylene. This is 2.5 times the amount of n-butyllithium initiator, on an equivalent basis. A 1-cc aliquot of this solution is taken and quenched in $CH_3OH$ to obtain poly(t-butylstyrene) homopolymer (block A), with GPC (determined in THF at 25° C.) molecular weight data as follows: $\overline{M}_w = 14{,}890$; $\overline{M}_n = 11{,}780$ and $\overline{M}_w/\overline{M}_n = 1.26$. The solution is then chilled to about $-78°$ C. using a dry ice/acetone bath and 1.0 g of high purity methyl methacrylate is injected slowly (5 minutes) with a microsyringe. Then 5.8 g of a 5:1 by weight mixture of methyl methacrylate and vinyl methacrylate is injected into the well stirred, clear, yellow "living polymer" solution over a 2-minute period. After stirring an additional 15 minutes, the polymerization is then terminated by the addition of 100 ml ethyl alcohol. The product is precipitated in $CH_3OH$, filtered and vacuum dried 4 hours at 50° C. There is obtained 10.8 g of block terpolymer (theory 15.3 g). The polymer is nominally a 57/38/5 block copolymer of t-butylstyrene, methyl methacrylate and vinyl methacrylate. GPC (THF at 25° C.) determined weight average molecular weight ($\overline{M}_w$) is 20,880 and number-average molecular weight ($\overline{M}_n$) is 14,550. The experimental $\overline{M}_w/\overline{M}_n$ ratio is 1.43. This block copolymer is soluble or dispersible in an 80/20 (volume ratio) mixture of pentane/isoprene or butane/isoprene, yielding an opalescent solution at 50° C.

Block terpolymers of t-butylstyrene/methyl methacrylate/vinyl methacrylate of weight percentages ranging from 50 to 70; 20 to 48; 2 to 10 respectively, are considered to be excellent non-aqueous dispersion stabilizers.

yellow-orange end point. Then 10 ml (9.3 gm) of p-vinyl toluene, purified as in Example 1, is added. The block copolymerization experiments 7 through 17 are then carried out as in Example 1, except that the amount of high purity methyl methacrylate is varied between 0.055 ml (0.052 gm) and 2.0 ml (1.9 gm) to produce block copolymer products with methyl methacrylate contents ranging from one terminal unit per polymer molecule to, nominally, about 17 weight percent. In each experiment 1 equivalent of 1,1'-diphenyl ethylene, based on the amount of n-butyl lithium initiator, is added to the "living" poly-p-vinyl toluene before methyl methacrylate addition is started. The data on these polymer syntheses are summarized in Table 1.

TABLE 1

| | | | P-Vinyl Toluene/mma Block Copolymer Stabilizers GPC Molecular Weights | | | | | |
|---|---|---|---|---|---|---|---|---|
| | Polymer Percent | Solubility, | P-Vinyl Toluene Block A | | | Block Copolymer | | |
| Example | Yield | butane[a] | $M_w$ | $M_n$ | $M_w/M_n$ | $M_w$ | $M_n$ | $M_w/M_n$ |
| | | Poly-p-Vinyl Toluene Homopolymer | | | | | | |
| 7 | 98 | Clear Solution | 9,630 | 7,730 | 1.25 | — | — | — |
| | | Mma-Terminated Polyvinyl Toluene | | | | | | |
| 8 | 98[b] | Clear Solution | 24,800 | 17,800 | 1.39 | — | — | — |
| | | 95/5 P-Vinyl Toluene/mma Block Copolymer | | | | | | |
| 9 | 97[c] | Opalescent Solution | 7,660 | 6,120 | 1.25 | 7,700 | 6,310 | 1.22 |
| 10 | 96 | Opalescent Solution | 14,070 | 8,690 | 1.62 | 14,560 | 9,120 | 1.60 |
| 11 | 93 | Opalescent Solution | 16,330 | 9,140 | 1.79 | 16,110 | 9,230 | 1.75 |
| 12 | 97 | Cloudy Solution | — | — | — | 22,500 | 16,600 | 1.35 |
| | | 90/10 P-Vinyl Toluene/mma Block Copolymer | | | | | | |
| 13 | 97[c] | Opalescent Solution | 7,660 | 6,120 | 1.25 | 8,080 | 6,510 | 1.24 |
| 14 | 96 | Opalescent Solution | 14,090 | 8,690 | 1.62 | 14,650 | 9,290 | 1.58 |
| 15 | 93 | Opalescent Solution | 16,330 | 9,140 | 1.79 | 16,470 | 9,450 | 1.74 |
| 16 | 97 | Very Cloudy Solution | — | — | — | 23,100 | 16,800 | 1.37 |
| | | 83/17 P-Vinyl Toluene/mma Block Copolymer | | | | | | |
| 17 | 99 | Partly Soluble, Very Cloudy Solution | 24,800 | 17,800 | 1.39 | 30,800 | 20,300 | 1.51 |

[a]Stabilizer dissolved in 20 parts isoprene and diluted with 80 parts butane. The mixture is heated to 50° C. then cooled to room temperature and observed.
[b]99.5/0.5, p-vinyl toluene/MMA weight ratio.
[c]Block copolymer polymerization done in benzene at 5° C.

EXAMPLES 7 THROUGH 17

Polyvinyl Toluene-b-Methyl Methacrylate

Block copolymers are prepared using the same general procedure followed in Example 1, except that the polymerizations are conducted on a smaller scale, in single neck, 125 cc Pyrex vials fitted with rubber septums. The polymerizations are conducted in vials that are first purged of major air and water impurities by preheating to 110° C. in an oven, then passing high purity argon through the bottle while it cools to ambient temperature via a flow system involving hypodermic needle entrance and exit ports inserted through the rubber septum. Back diffusion of air into the reaction chamber is prevented by passing the argon flush through two empty buffer vessels connected in series to the polymerization vial, then to the outside atmosphere through a mineral oil bubble tube. After about a 30 minute argon purge, 80 ml high purity THF prepurged with argon and stored over CaH$_2$ drying agent are transferred to the reaction vessel with a hypodermic syringe. One microdrop (5 ul) of a monomer, such as p-vinyl toluene, is added to act as a color indicator and any residual impurities are removed by titration of the stirred solution (Teflon ® coated magnetic stir bar) to a

EXAMPLES 18 THROUGH 33

Polyisoprene-b-Methyl Methacrylate

Block copolymers are prepared using the same general procedure followed in Examples 7 through 17, but using the monomer pair of Example 3. Isoprene (15 ml, 10.2 gm) is used instead of p-vinyl toluene and the isoprene polymerization is conducted in 85 ml of THF at 40°–50° C. for 30 minutes to 1 hour. After 1 equivalent of 1,1'-diphenylethylene is added, based on the amount of n-butyllithium initiator used, the reaction temperature is dropped to about −78° C. with a dry ice/acetone bath. Then high purity methyl methacrylate is injected into the reaction mixture to produce block copolymers. The amount of methyl methacrylate is varied between 0.020 ml (0.018 gm) and 2.75 ml (2.60 gm) to produce block copolymer products with methyl methacrylate contents ranging from one terminal unit per polymer molecule to, nominally, about 20 weight percent. The actual block copolymer compositions (weight ratio of isoprene to methyl methacrylate) may vary from the monomer charge ratios depending on relative conversion of isoprene and methyl methacrylate. The data are summarized in Table 2.

TABLE 2

Isoprene/mma Block Copolymer Stabilizers

| | Composition | | Polymer Percent | Solubility[b] | | GPC Molecular Weight | | | |
|---|---|---|---|---|---|---|---|---|---|
| | | | | | | Isoprene Block A | | Block Copolymer | |
| Example | Isoprene | MMA[a] | Yield | Butane[c] | Heptane[d] | $M_w$ | $M_n$ | $M_w$ | $M_n$ |
| *Polyisoprene Homopolymers* | | | | | | | | | |
| 18 | 100 | — | 90 | S. | S. | 14,800 | 11,900 | — | — |
| 19 | 100 | — | 85 | S. | S. | 17,900 | 13,500 | — | — |
| 20 | 100 | — | 84 | S. | S. | 30,500 | 21,400 | — | — |
| 21 | 100 | — | 70 | S. | S. | 40,800 | 27,500 | — | — |
| 22 | 100 | — | 65 | S. | S. | 56,800 | 34,500 | — | — |
| *Mma-Terminated Polyisoprene* | | | | | | | | | |
| 23 | 99.6 | 0.4 | 73 | S. | S. | 58,100 | 34,800 | 58,800 | 35,100 |
| *95/5 Isoprene/mma Block Copolymer* | | | | | | | | | |
| 24 | 95 | 5 | 76 | O.S. | I. | 56,800 | 37,500 | 66,000 | 37,500 |
| *90/10 Isoprene/mma Block Copolymers* | | | | | | | | | |
| 25 | 90 | 10 | 80 | O.S. | O.S. | 17,900 | 13,500 | 21,400 | 15,700 |
| 26 | 90 | 10 | 83 | O.S. | P.S., O.S. | 30,500 | 21,400 | 34,100 | 23,500 |
| 27 | 90 | 10 | 73 | O.S. | I. | 40,800 | 27,500 | 47,100 | 30,100 |
| *80/20 Isoprene/mma Block Copolymers* | | | | | | | | | |
| 28 | 80 | 20 | 74 | O.S. | O.S. | 14,800 | 11,900 | 19,100 | 14,400 |
| 29 | 80 | 20 | 82 | O.S. | P.S., O.S. | 17,700 | 13,600 | 22,400 | 16,400 |
| 30 | 80 | 20 | 84 | O.S.H. | P.S., O.S. | 32,000 | 22,700 | 39,700 | 26,300 |
| 31 | 80 | 20 | 90 | O.S.H. | O.S. | 33,600 | 25,300 | 40,300 | 27,500 |
| 32[e] | 80 | 20 | 78 | O.S.H. | I. | 50,500 | 33,600 | 65,100 | 37,400 |
| 33 | 80 | 20 | 75 | O.S.H. | I. | 51,500 | 35,800 | 65,000 | 42,200 |

[a] Methyl Methacrylate.
[b] S. = soluble; P.S. = partly soluble; I. = insoluble; O.S. = opalescent solution; O.S.H. = opalescent solution hot (50° C.).
[c] Stabilizer dissolved in 20 parts isoprene and diluted with 80 parts butane. The mixture is heated to 50° C. then cooled to room temperature and observed.
[d] Solubility in n-heptane at room temperature.
[e] Block copolymer shows bimodal character (high molecular weight impurity) on GPC molecular weight trace.

NON-AQUEOUS DISPERSION POLYMERIZATION TO FORM THE MAIN POLYMER

EXAMPLE 34

Isoprene Polymerization

The stabilizers obtained in Examples 1 to 4 are effective in improving the flowability of triisobutyl aluminum-titanium tetrachloride catalyzed polymerization of isoprene to polyisoprene. In this example, a series of runs is made to demonstrate the polymerization of isoprene in the presence of various stabilizers of the invention, various amounts of stabilizer, various solids levels and conversion rates. In conducting the polymerizations, 6½ oz soft-drink bottles are charged with copolymer stabilizer, monomer to be polymerized and liquid organic dispersion medium. It is preferred to dissolve the block copolymer dispersion stabilizer in the monomer before adding the liquid dispersion medium. The bottle is capped with a metal lid through which a small hole has been drilled, sealed first with a disk of butyl rubber, secondly with a nitrile rubber disk, and finally with a "Teflon" disk. The mixture of stabilizer, monomer and dispersion medium is warmed to reaction temperature (50° C.) before the catalyst is injected to effect a complete solution. The catalyst used is a mixture of triisobutylaluminum diphenyletherate and titanium tetrachloride in amounts so that the mole ratio is 0.85/1 of Al/Ti. The catalyst is used as a 20 weight percent suspension in n-hexane. The catalyst is injected through the seal into the bottle using a microsyringe. The bottle is placed in a tumble bath and held at a polymerization reaction temperature (50° C.) until polymerization is substantially complete. Then an amount of antioxidant (Cyanamid Antioxidant 425) equivalent to approximately 0.5 percent by weight based on the poly-cis-1,4-isoprene product is added dissolved in isopropyl alcohol (IPA) such that approximately 17 ml IPA is added per 100 gm of polymer. The polymerization product is recovered by drying the polymerization mass to constant weight under vacuum.

As shown by the data in Table 1, high conversions of isoprene to poly-cis-1,4-isoprene are obtained in butane and pentane with the block copolymers of Examples 1 to 4, and the polymerizates that are obtained are flowable.

TABLE 3

Performance Of Stabilizers In Ziegler-Natta Polymerizations

| | Percent Conversion[a] | | Flowability of |
|---|---|---|---|
| Stabilizer | In Butane | In Pentane | Polymerizate |
| Example 1 (PVT/MMA) | 80.7 | 89.6 | Good in hot butane None in hot pentane |
| Example 2 (Styrene/Isoprene) | 80.8 | 94.0 | Good in hot butane Good in hot pentane |
| Example 3 (Isoprene/MMA) | 79.3, 73.4 | 88.1 | Good in hot butane Fair in hot pentane |
| Example 4 (PVT/Styrene) | 82.4, 71.9 | 86.6 | Fair in hot butane Fair in hot butane |
| Control | 83.7 | 74.0 | None |

[a] After 2 to 8 hours at 50° C.; 1 cc of catalyst; 50 cc total volume; 20 volume percent isoprene.

It will be noted from the data in Table 3 that good conversion to isoprene is obtained and that the polymerizate is flowable in hot butane (50° C.) and/or hot pentane (50° C.). It will be noted further that the polymerizate obtained in the controls which contain no stabilizer is not flowable. The polyisoprene obtained with the stabilizers of Example 1 to 4 exhibit a high cis-content and also have molecular weights required of the commercial materials. Qualitatively, the polyisoprene products that are isolated from the polymerization have good strength and self-tack. High polymers are obtained with GPC molecular weights of $10^5$ to $10^6$ and dilute-solution, reduced viscosities of 2 to 5 (dl/g, toluene, 25° C.).

The stabilizers obtained in Examples 1 to 4 are so efficient that only small amounts are required to promote the formation of a stable non-aqueous dispersion polymerization. Excessive amounts of stabilizer, as shown with reference to polyvinyl toluene-b-methyl methacrylate in Table 4, do not improve the viscosity of the polymerizate and have an adverse effect on the final physical properties of the rubber products.

TABLE 4
Flowability Of Ziegler-Natta Polymerizates At Various Stabilizer Levels

| Weight Percent Stabilizer[a] | Volume Percent Isoprene | Percent Conversion[b] | Flowability of Polymerizate[c] | Strength, self-tack |
|---|---|---|---|---|
| 0(Control) | 20 | 83.7 | — | Excellent |
| 1.47 | 20 | 80.7 | + | Excellent |
| 2.94 | 20 | 71.5 | + | Excellent |
| 5.87 | 20 | 53.5 | + | Good |
| 8.81 | 20 | 52.6 | + | Fair |
| 14.68 | 20 | 51.2 | + | Poor |
| 8.81 | 20[d] | 94.0[d] | + | Fair |

[a]Based on monomer; stabilizer of Example 1 (95/5 ratio of polyvinyl toluene/methyl methacrylate block copolymer of $M_w$ = 13,970)
[b]After 5 hours at 50° C. in glass bottles, using 1 cc of catalyst per 50 cc of polymerizate in butane diluent.
[c](+) = flow; (−) = no flow.
[d]In pentane diluent.

As little as 0.7 percent of the polyvinyl toluene-b-methyl methacrylate copolymer of Example 1 is effective in the polymerization of isoprene as shown by the data in Table 5.

TABLE 5
Flowability Of Ziegler-Natta Polymerizates At Various Solids Levels

| Weight Percent Stabilizer[a] | Volume Percent Isoprene | Percent Conversion[b] | Flowability of Polymerizate[c] |
|---|---|---|---|
| 0.73 | 20 | 84.3 | + |
| 0.73 | 25 | 84.4 | + |
| 0.73 | 30 | 86.6 | —[d] |
| 0.73 | 35 | 85.6 | —[d] |
| 0.73 | 40 | 80.9 | —[d] |
| 0(Control) | 20 | 83.7 | — |

[a]Stabilizer of Example 1 (95/5 ratio of polyvinyl toluene/methyl methacrylate, block copolymer of $M_w$ = 13,970).
[b]1 cc of catalyst/50 cc polymerizate, 24 hours at 50° C., using n-butane as diluent.
[c](+) = flow; (−) = no flow.
[d]Addition of a few ml of alcohol permits flow.

Using the polyvinyl toluene-b-methyl methacrylate copolymer of Example 1, it is noted that the upper limit for solids level with polyisoprene is about 30 volume percent (also approximately 30 weight percent). At a solids level of 30 percent, the amount of free supernatant diluent is at a minimal amount. At 40 percent solids, the polymerizate does not flow despite increased stabilizer amounts. These data are shown in Table 6.

TABLE 6
Flowability Of Ziegler-Natta Polymerizates At High Solids Level Compared To Increasing Stabilizer

| Weight Percent Stabilizer[a] | Volume Percent Isoprene | Percent Conversion[b] | Flowability of Polymerizate[c] | Flowability After Alcohol |
|---|---|---|---|---|
| 0.73 | 40 | 88.1 | — | + |
| 1.47 | 40 | 85.9 | — | + |
| 2.94 | 40 | 75.6 | — | + |
| 4.41 | 40 | 69.8 | — | + |
| 7.34 | 40 | 31.6 | — | + |
| 0.73 | 30 | 88.1 | + | + |
| 1.47 | 30 | 89.1 | + | + |
| 2.94 | 30 | 81.3 | + | + |
| 4.41 | 30 | 80.3 | + | + |
| 7.34 | 30 | 79.3 | + | + |
| 0 (Control) | 20 | 83.7 | — | — |

[a]Based on monomer; stabilizer of Example 1, (95/5 ratio of polyvinyl toluene/methyl methacrylate block copolymer of $M_w$ = 13,970).
[b]After 3 hours at 50° C. in glass bottles, using 1 cc of catalyst per 50 cc of polymerizate in butane diluent.
[c](+) = flow; (−) = no flow.
[d]Polymerizates release from wall and flow after 3 ml of alcohol were added to terminate reaction.

Conversion rates of isoprene to poly-cis-1,4-isoprene are shown in Table 7.

TABLE 7
Conversion Times Of Isoprene To Poly-Cis-1,4-Isoprene At 50° C., In Butane, At 20 Volume Percent Isoprene, 2.9 Percent Stabilizer (Relative To Isoprene) Of Example 1

| 2.15% Catalyst[a] | | 1.08% Catalyst[a] | |
|---|---|---|---|
| Hours | % Conversion | Hours | % Conversion |
| 0.47 | 29.4 | 1.0 | 9.8 |
| 0.60 | 32.3 | 2.0 | 14.2 |
| 0.70 | 35.2 | 3.0 | 15.1 |
| 0.85 | 35.2 | 5.0 | 25.8 |
| 1.0[b] | 33.8[b] | 24.0 | 40.5 |
| 1.02 | 36.7 | | |
| 1.52 | 44.0 | | |
| 2.02 | 47.0 | | |
| 3.0[b] | 44.0[b] | | |
| 4.02 | 55.9 | | |
| 5.98 | 63.1 | | |
| 8.0[b] | 82.4[b] | | |
| 23.3 | 76.4 | | |
| 24.0[b] | 74.9[b] | | |
| 0.82[c] | 83.7[c] | | |
| 4.5[d] | 80.0[d] | | |

[a]Relative to isoprene
[b]Replicate with separate catalyst preparation.
[c]Control, no stabilizer.
[d]Stabilizer of Example 2 in pentane.

It will be noted from the data in Table 7 that the production rate of polyisoprene is somewhat slower with the stabilizer of Example 1 (polyvinyl toluene-b-methyl methacrylate) than with the stabilizer of Example 2 (isoprene-b-styrene). This we believe is attributed to the polar moieties (polymethyl methacrylate) present in the stabilizer of Example 1 which tends to deactivate catalyst.

In further bottle polymerization evaluation of polyvinyl toluene-b-methyl methacrylate copolymer stabilizers at a 3 weight percent level based on isoprene, we have found that if the polymethyl methacrylate content (weight percent) of the copolymer is reduced from about 5 percent as in Example 1 to only about 0.5 percent (Example 8), stabilization is still effected, although a poor quality dispersion with traces of wall deposits is observed. However, when poly-p-vinyl toluene homopolymer (Example 7) is used as the dispersion stabilizer, the cis-1,4-polyisoprene precipitates on the bottle walls as a tenaciously adhering precipitate indistinguishable from a control polymerization in which no stabilizer is added. Thus, the effect of only one terminal methyl methacrylate unit per poly-p-vinyl toluene chain is indeed striking. The other stabilizers of Table 1 (Examples 9 through 17) all produce good cis-1,4-polyisoprene dispersions that appear qualitatively similar. However, Examples 16 and 17 show some slight accumulation of polyisoprene wall deposits indicating that these stabilizers may be approaching the desirable upper levels of total stabilizer molecular weight or methyl methacrylate content.

EXAMPLE 35

Isoprene Polymerization

A clean, dry, 6½ oz. soft-drink bottle is charged with 0.255 g of the dispersion stabilizer of Example 6 and 15 cc of distilled, dry isoprene. After solution is completed, 50 cc of n-butane is added. The butane is allowed to boil off to displace air until 35 cc of butane remains. Then 1.0 cc of the Ziegler-Natta catalyst described in Example 34 is added, and the bottle is capped with a "Teflon"-lined bottle cap. The bottle is then tumbled in a 50° C. water bath for 100 hours, producing a butane-thin, free-flowing brown polymer dispersion. When the dispersion is cooled to about 20° to 25° C., it becomes appreciably more viscous, with substantial separation of product from the diluent. When reheated above about 20° to 25° C., the dispersion reversibly changes to the consistency of n-butane. The product rubber is mixed with antioxidant as in Example 7, coagulated, collected and dried to give 8.1 g (79% of theory) of a tan, tough, snappy elastomer with excellent self tack. This represents a solids level in the reactor at the end of the reaction period of 16.2 g per 100 cc (23.8 weight percent). The GPC molecular weight measured in trichlorobenzene at 135° C. is: $\overline{M}_w = 283,900$ and $\overline{M}_n = 77,700$ with $\overline{M}_w/\overline{M}_n = 3.66$.

EXAMPLE 36

Isoprene Polymerization

Cis-1,4-polyisoprene is prepared according to the general procedure described in Example 35, except that 10 cc of isoprene and 40 cc of butane are used. The isoprene polymerization is carried out by tumbling the sealed bottles in a 50° C. bath for 24 hours to insure maximum conversion to polyisoprene. However, the polymerizations appear to be complete in 2 to 6 hours (i.e. no changes are observed qualitatively after those time periods). The results of these polymerizations are summarized in Table 8. Polyisoprene homopolymers (block A polymers) are seen to prevent cis-1,4-polyisoprene from forming a completely plated out, immobile coating on the bottle walls in butane. This behavior is in contrast to poly-p-vinyl toluene homopolymer which had no observable effect on the isoprene polymerization. However, the cis-1,4-polyisoprene is agglomerated into a large mass which either disperses only into very large pieces (Experiments 3 and 5) or does not disperse at all (Experiments 7, 9 and 11). Polyisoprene with one MMA terminal unit provides an observable increase in dispersion character (Experiment 13) but the dispersion quality is still poor. The 95/5 isoprene/MMA (nominal composition) block copolymer provides a good dispersion, while the 90/10 and 80/20 copolymers all provide very good dispersions with little to choose from on a qualitative basis when the hot (50° C.) dispersions are compared. However, after the dispersions are cooled to room temperature and allowed to stand 24 hours, some comparison can be made of the degree to which the polyisoprene separates from the butane solvent. Although the results are not clearcut, it appears that better separation occurs when the higher molecular weight 80/20 isoprene/MMA stabilizers are used. However, useful dispersion characteristics are imparted by the complete range of isoprene/MMA block copolymer stabilizers listed in Table 8.

TABLE 8

Effect Of Isoprene/Methyl Methacrylate Block Copolymer Stabilizers On Dispersion Quality In Isoprene Polymerizations

| Exp. (a) | Stabilizer from Example No | Stabilizer[b] Composition[c] Isoprene | MMA | Block $M_n$ | Product Description 50° C. Flowability[d] Butane | Room Temperature[d] Butane[f] | Percent Yield in Butane | DSV dl/g |
|---|---|---|---|---|---|---|---|---|
| | | Polyisoprene Homopolymer Stabilizers | | | | | | |
| 1 | Control No stabilizer | — | — | — | Product coated on walls. No flow. | Same as 50° C. | 72 | 3.0 |
| 2 | 18 | 100 | — | 11,900 | One large polymer ball that breaks up into cm or larger sized pieces when shaken vigorously. Some wall deposits of polyisoprene. | Dark brown, extremely viscous fluid that flows very slowly. Slight wall deposits. Cloudy ~14 cm (~38 percent of total) butane layer. | 77 | 2.0 |
| 3 | 19 | 100 | — | 13,500 | Similar to 2. | Similar to 2 with ~16 cm (~42 percent) butane layer. | 68 | 2.0 |
| 4 | 20 | 100 | — | 21,400 | One large polymer ball with more wall deposits than 3. Does not break up when shaken. | Similar to 2 except light brown polymer fluid with ~20 cm (~53 percent) butane layer and more polymer stuck to walls. Flows better than 3. | 75 | 1.9 |
| 5 | 21 | 100 | — | 27,500 | Similar to 4 with more wall deposits | Similar to 4 with ~22 cm (~58 percent) butane layer and considerable wall deposits. | 73 | — |
| 6 | 22 | 100 | — | 34,500 | Similar to 5. | Similar to 5. | 75 | 2.0 |
| | | Mma-Terminated Polyisoprene Stabilizer | | | | | | |
| 7 | 23 | 99.6 | 0.4 | 35,100 | One large polymer ball that broke into ~ 1 mm to 1 cm pieces when shaken vigorously. | Not inspected. | 77 | 1.8 |
| | | 95/5 Isoprene/Mma Block Copolymer Stabilizer | | | | | | |
| 8 | 24 | 95 | 5 | 37,500 | One large agglomerate that easily disperses (≧ 1 mm-1cm pieces) when shaken slightly | Not inspected | 75 | 1.9 |
| | | 90/10 Isoprene/Mma Block Copolymer Stabilizer | | | | | | |
| 9 | 25 | 90 | 10 | 15,700 | Excellent dispersion. Extremely fine particle (< 1 mm) dispersion. Settles quickly when agita- | Similar to 2 but flows faster. Cloudy ~13 cm (~ 34 percent) liquid layer | 39 | — |

TABLE 8-continued
Effect Of Isoprene/Methyl Methacrylate Block Copolymer Stabilizers On Dispersion Quality In Isoprene Polymerizations

| Exp. (a) | Stabilizer from Example No | Stabilizer[b] Composition[c] Isoprene | MMA | Block $M_n$ | 50° C. Flowability[d] Butane | Room Temperature[d] Butane[f] | Percent Yield in Butane | DSV dl/g |
|---|---|---|---|---|---|---|---|---|
| | | | | | tion ceases. | | | |
| 10 | 26 | 90 | 10 | 23,500 | Similar to 9. | Similar to 9. Clear ~10 cm (~26 percent) butane layer | 75 | 1.9 |
| 11 | 27 | 90 | 10 | 30,100 | Similar to 9. | Similar to 9 but light brown. Cloudy ~11 mm (~29 percent) butane layer. | 60 | 2.8 |
| | | | | 80/20 Isoprene/Mma Block Copolymer Stabilizers | | | | |
| 12 | 28 | 80 | 20 | 14,400 | Similar to 9 . | Similar to 9 . Cloudy ~8 cm (~21 percent) butane layer. | 50 | — |
| 13 | 29 | 80 | 20 | 16,400 | Similar to 9. | Similar to 9 . Clear ~10 cm (~26 percent) butane layer | 75 | 2.0 |
| 14 | 30 | 80 | 20 | 26,300 | Similar to 9 with slightly larger particles. | Clear ~12 cm (~31 percent) butane layer. | 71 | 1.0 |
| 15 | 31 | 80 | 20 | 27,500 | Similar to 9. | Not inspected. | 84 | 2.9 |
| 16 | 3 | 80 | 20 | 33,700 | Similar to 9 . | Not inspected. | 83 | 2.6 |
| 17 | 32 | 80 | 20 | 37,400 | Similar to 9. | Similar to 9 . Cloudy ~18 cm butane layer. | 44 (~47 percent) | — |
| 18 | 33 | 80 | 20 | 42,200 | Similar to 14. | Not inspected. | 84 | 1.8 |

[a]Tumble polymerized 24 hours at 50° C. in sealed 6.5-oz. bottles.
[b]2.74 weight percent based on isoprene used in Ziegler-Natta polymerization
[c]Composition data (isoprene/MMA ratio) are nominal
[d]Qualitative based on visual observation and handling.
[e]Dilute solution (0.1 g/dl) viscosities in toluene at 30°C.
[f]Observed after sitting at room temperature 24 hours. Total depth of reaction mixture ~38 cm. All are separated into a bottom layer of brown polymer fluid and an upper butane layer.

EXAMPLE 37

1,3-Butadiene Polymerization

A purified butadiene-pentane solution containing 10 grams of butadiene per hundred milliliters of solution was charged to a number of 4-oz bottles. A nitrogen blanket over this premix was maintained while the dispersion stabilizer and the catalyst were charged. The block copolymer dispersion stabilizer employed was a 23 styrene/77 isoprene weight ratio copolymer stabilizer prepared in the manner similar to that in Example 2. The 23 styrene/77 isoprene copolymer stabilizer was dissolved in heptane and charged to the premix at 0.5, 1.0, 2.0, and 3.0 weight percent with respect to the butadiene in the premix. The catalysts added were (a) triisobutylaluminum (TIBAL) as a 0.25 molar (M) solution in hexane, (b) a 0.05 molar nickel octanoate (NiOct) in hexane, and (c) a 0.25 molar hydrogen fluoride di-n-butyl ether complex (HF.n-Bu$_2$O) in hexane. The bottles were capped tightly and placed in a water bath maintained at 50° C. while tumbling end-over-end for 2 hours. The amount of TIBAL, NiOct, and HF.n-Bu$_2$O charged to each bottle was 0.1, 0.005 and 0.3 millimoles per 10 grams of butadiene respectively. The amount of stabilizer was varied as shown in the table below. The polymerizations were terminated by mixing the polymer cements with one part of triisopropanolamine and one part of dibutylparacresol per hundred parts of original butadiene employed. The resulting polybutadiene polymers were dried under vacuum. The polymer yields, dilute solution viscosities (DSV), and dispersion ratings are presented in Table 9 below. The dispersion ratings are not absolute but are a visual observation of the dispersions formed in the various experiments.

Table 9

| Exp | Stabilizer Wt % | Yields Wt % | DSV dl/gm | Dispersion Rating |
|---|---|---|---|---|
| 1 | 0.0 | 60.7 | 6.18 | poor |
| 2 | 0.5 | 57.5 | 6.30 | poor |
| 3 | 1.0 | 58.0 | — | fair |
| 4 | 2.0 | 40.3 | 6.35 | fair |
| 5 | 3.0 | 53.5 | 6.05 | good |

EXAMPLE 38

1,3-Butadiene Polymerization

A series of butadiene polymerizations was carried out in a manner very similar to Example 37 except that the copolymer dispersion stabilizers were varied. These block copolymer dispersion stabilizers were prepared by procedures employed as set forth in Examples 1-4. The stabilizers employed are as follows:

(1) 95 para-vinyl toluene/5 methyl methacrylate
(2) 77 styrene/23 isoprene
(3) 79 isoprene/21 methyl methacrylate
(4) 90 para-vinyl toluene/10 styrene Stabilizers 1, 3 and 4 which were solid materials were dissolved in a mixed benzene/heptane solution containing 20 to 40 volume percent benzene and 80 to 60 volume percent heptane. The stabilizers were charged at 0.5, 1, 2 and 3 weight percent with respect to the butadiene in the standard premix prior to the injection of 0.1 millimoles of TIBAL, 0.005 millimoles of NiOct, and 0.3 millimoles of HF.n-Bu$_2$O$_3$ per 10 grams of butadiene, respectively. These polymerizations were run in both pentane as a solvent and in hexane as a solvent for 2 hours at 50° C.

In pentane, stabilizers Nos. 1 and 4 yielded thick polymer masses on the bottoms of the polymerization bottles. Stabilizer Nos. 2 and 3 gave dispersions of polybutadiene which remained suspended during agitation but coalesced upon standing without further agitation. The conversions obtained ranged from about 40 to about 50 weight percent. The conversions decreased slightly with increased stabilizer level. This decrease in conversion may be caused by some impurities in the stabilizers or it may be caused by the presence of polar moieties in the block copolymer structures.

In the solvent hexane, no dispersions were noted although the polymer cement viscosity as observed visually decreased with increased stabilizer content. The conversions obtained were about 50 to 60 weight percent and decreased slightly with increased stabilizer level.

EXAMPLE 39

1,3-Butadiene Polymerization

In these experiments similar butadiene polymerizations were conducted with 4 different stabilizers having 23 weight percent styrene/77 weight percent isoprene composition prepared in a manner in accordance with Example 2. The difference between the stabilizers were that they varied in molecular weights as follows:

(1) 92,800
(2) 46,400
(3) 30,900
(4) 23,200

All the polymerizations were carried out in pentane at 50° C. for 2 hours in the same manner as in Example 10. The stabilizers were charged at 0.5, 1, 2, 3, 5, 7 and 10 weight percent with respect to the butadiene charged. The poor dispersions of polybutadiene were observed at the 0.5, 1 and 2 weight percent stabilizer levels. At 3, 5 and 7 weight percent levels, good dispersions were obtained. It was visually observed that more fluid dispersions were obtained with the lower molecular weight stabilizers. At the 3, 5, and 7 weight percent stabilizer level, all of the polybutadiene dispersions coalesced upon standing without agitation. At the 10 weight percent stabilizer level, the polymer settled out of solution as a fluid polymer mass in contrast to a solid mass at the 0.5 weight percent stabilizer level. All conversions were between about 35 and 50 percent when stabilizers were employed. In a controlled polymerization in which no stabilizer was added the conversion obtained was about 60 percent. In this controlled polymerization which contains no dispersion stabilizer, the polybutadiene was completely dissolved and formed a solution in the pentane.

EXAMPLE 40

Isoprene Polymerization 5 Gallon Batches

In this example several batch polymerizations were effected in a 5 gallon glass-lined jacketed reactor equipped with four 1-inch baffles. The agitation was provided by two 6-inch diameter axial flow turbines. Isoprene was mixed with butane and dried by passing the mixture through a silica gel bed. The mixture was added to the reactor in various concentrations of isoprene in butane as set forth in the table below. The block polymer dispersion stabilizer, which was a 79 weight percent polyisoprene/21 weight percent polymethyl methacrylate prepared according to the procedure of Example 3, was syringed into the reactor as a 20 percent toluene solution. The catalyst was then injected and temperature raised to 122° F. The catalyst employed was a mixture of triisobutylaluminum diphenyletherate and titanium tetrachloride in amounts so that the mole ratio was 0.85/1 of Al/Ti. The amount of catalyst employed in parts of total catalyst per 100 parts of monomer charged is listed in the table as phm. The amounts of dispersion stabilizer employed are set forth in the table below in phm. The reactions were terminated with a mixture of 1 part each of tetraethylene pentamine and dibutylparacresol per hundred parts of original isoprene charged. Some of the operating conditions and results are given in Table 10 below.

TABLE 10

| | Batch Polymerization with NAD Modifier | | | | | | |
|---|---|---|---|---|---|---|---|
| Exp | Isoprene Wt % Butane | Modifier phm | Catalyst phm | Time hrs | Conv % | DSV | Conditions of Polymer |
| Control | 20 | — | 0.50 | 4 | 80 | 4.07 | Solution of polyisoprene in butane** |
| 1 | 20 | 1.0 | 0.54 | 2 | 67 | 3.18 | Dispersion of polyisoprene in butane |
| 2 | 30 | 1.0 | 0.50 | 4 | 83 | 3.82 | Dispersion of polyisoprene in butane |
| Control | 40 | — | 0.30 | 6 | * | * | Batch set up solid - no solution |
| 3 | 40 | 1.0 | 0.50 | 4 | 66 | 2.65 | Dispersion in butane |
| 4 | 40 | 1.0 | 0.30 | 6 | 50 | 4.47 | Dispersion in butane |

*Not measurable.
**Not a true solution but a swollen polyisoprene in the butane which would not separate into two phases upon stopping of the agitation. All of the polymers of Experiments 1, 2, 3 and 4 did separate into two phases upon standing with no agitation.

While certain representative embodiments and details have been shown for the purpose of illustrating the invention, it will be apparent to those skilled in this art that various changes and modifications may be made therein without departing from the spirit or scope of the invention.

What is claimed is:

1. In a process for the non-aqueous dispersion polymerization of a conjugated diolefin monomer in a liquid hydrocarbon dispersion medium with a Ziegler-Natta catalyst, the improvement which comprises carrying out the polymerization of conjugated diolefins in the presence of a block copolymer dispersion stabilizer comprising at least two polymer blocks linked by chemical valences wherein at least one of said polymer blocks ("A" block) is soluble in the dispersion medium and at least another of said polymer blocks ("B" block) is insoluble in the dispersion medium and the stabilizer acts to disperse polymers of conjugated diolefins which are formed in the stabilizer's presence.

2. The process of claim 1 in which the soluble "A" block is selected from polyisoprene, poly(t-butylstyrene), poly(vinyl toluene), polybutadiene, polymerized higher alkyl methacrylates, polyisobutene and poly(vinyl butylether) and their copolymers, and the insoluble "B" block is selected from polystyrene, poly(alpha-methyl styrene), copolymers of styrene or alpha-methyl styrene with isoprene or butadiene, polymerized lower alkyl acrylates and methacrylates and poly(alkylene oxides).

3. The process of claim 1 in which the liquid hydrocarbon dispersion medium is selected from n-butane, neopentane, n-pentane and a mixture of isomeric pentanes.

4. The process of claim 2 in which the conjugated diolefin monomer is butadiene-1,3.

5. The process of claim 2 in which the conjugated diolefin monomer is piperylene.

6. The process of claim 2 in which the conjugated diolefin monomer is isoprene.

7. The process of claim 1 in which the weight ratio of the "A" block/"B" block of the block copolymer dispersion stabilizer ranges from 99.9/0.1 to 50/50.

8. The process of claim 7 in which the weight ratio of the "A" block to the "B" block ranges from about 99/1.0 to about 75/25.

9. The process of claim 1 in which the "A" block of the copolymer dispersion stabilizer is poly(vinyl toluene) and the "B" block is poly(methyl methacrylate).

10. The process of claim 9 in which the weight ratio of poly(vinyl tolune)poly(methyl methacrylate) ranges from 99.9/0.1 to 50/50.

11. The process of claim 1 in which the "A" block of the copolymer dispersion stabilizer is polyisoprene and the "B" block is polystyrene.

12. The process of claim 11 in which the weight ratio of polyisoprene/polystyrene ranges from 99.9/0.1 to 50/50.

13. The process of claim 1 in which the "A" block of the copolymer dispersion stabilizer is polyisoprene and the "B" block is poly(methyl methacrylate).

14. The process of claim 13 in which the weight ratio of polyisoprene/poly(methyl methacrylate) ranges from 99.9/0.1 to 50/50.

15. The process of claim 1 in which the "A" block of the copolymer dispersion stabilizer is poly (vinyl toluene) and the "B" block is polystyrene.

16. The process of claim 15 in which the weight ratio of poly(vinyl toluene)/polystyrene ranges from 99.9/0.1 to 50/50.

17. The process of claim 1 in which the "A" block of the copolymer dispersion stabilizer is poly(t-butylstyrene) and the "B" block is a copolymer of methyl methacrylate and vinyl methacrylate.

18. The process of claim 17 in which the weight ratio of poly(t-butylstyrene)/methyl methacrylate/vinyl methacrylate ranges from 50–70/20–48/2–10 respectively.

19. The process of claim 7 in which the "A" block of the copolymer dispersion stabilizer is poly (t-butylstyrene) and the "B" block is a copolymer of styrene and isoprene.

20. The process of claim 19 in which the weight ratio of poly(t-butylstyrene)/styrene-co-isoprene ranges from 99.9/0.1 to 50/50.

21. The process of claim 3 in which the liquid hydrocarbon dispersion medium is n-butane and the conjugated diolefin monomer is isoprene which, upon polymerization in said process, is polymerized to poly-cis-1,4-isoprene that is a flowable dispersion of greater than 20 percent solids and does not adhere to the walls of the reaction vessel.

22. The process of claim 21 in which the butane dispersion of poly-cis-1,4-isoprene is a high conversion, high-molecular weight polymer dispersion that is flowable at greater than 20 percent solids when maintained at greater than 30° C., while, at lower temperatures, the polymer sediments substantially from the butane.

23. The process of claim 3 in which the liquid hydrocarbon dispersion medium is a mixture of isomeric pentanes and the conjugated diolefin monomer is isoprene which, upon polymerization in said process, is polymerized to poly-cis-1,4-isoprene that is flowable at greater than 20 percent solids when maintained at greater than 30° C., while, at lower temperatures, the polymer sediments substantially from the pentanes.

24. The process of claim 3 in which the liquid hydrocarbon dispersion medium is n-butane and the conjugated diolefin monomer is butadiene which, upon polymerization in said process, is polymerized to cis-1,4-polybutadiene that is a flowable dispersion of greater than 20 percent solids and does not adhere to the walls of the reaction vessel.

25. The process according to claim 22 in which the butane dispersion of the cis-1,4-polybutadiene is a high conversion, high molecular weight polymer dispersion that is flowable at greater than 20 percent solids when maintained at greater than 30° C., while, at lower temperatures, the polymer sediments substantially from the butane.

* * * * *